Dec. 1, 1953 H. A. IMHOF 2,660,739
MACHINE FOR USE IN MANUFACTURE OF SHOES
Filed Aug. 30, 1950 12 Sheets-Sheet 5
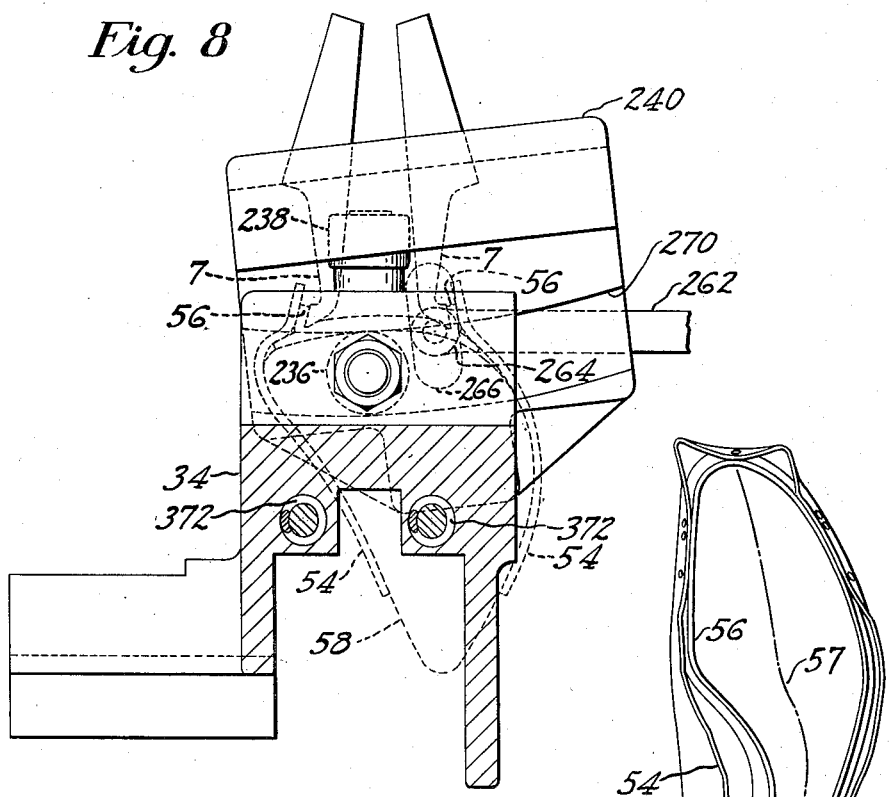
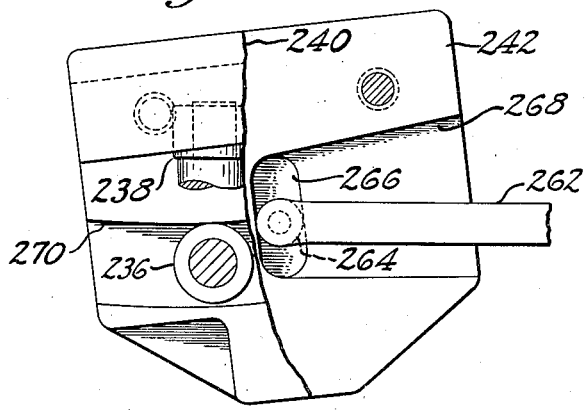
Inventor
Herman A. Imhof
By his Attorney Dec. 1, 1953          H. A. IMHOF          2,660,739
MACHINE FOR USE IN MANUFACTURE OF SHOES
Filed Aug. 30, 1950                           12 Sheets-Sheet 6

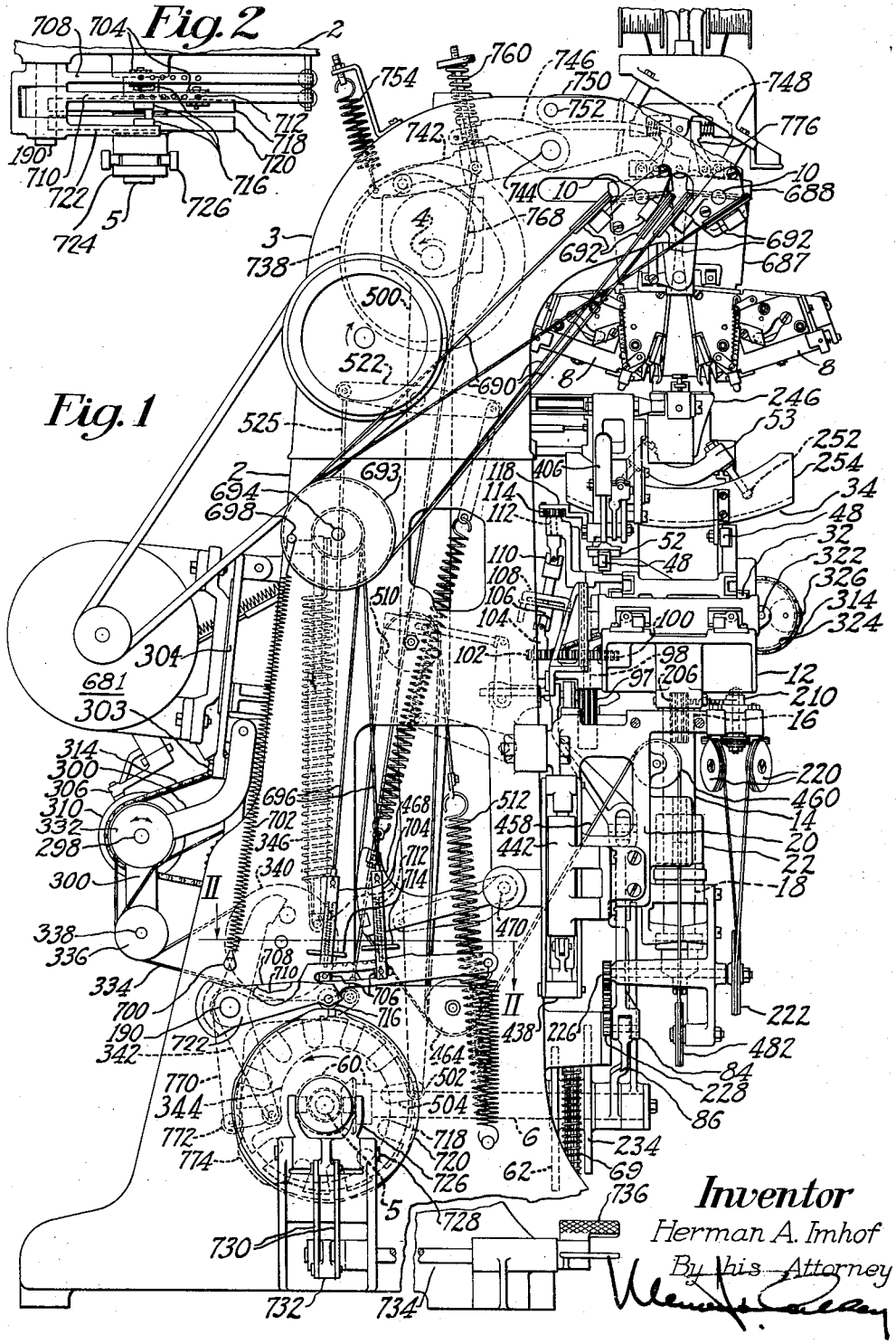

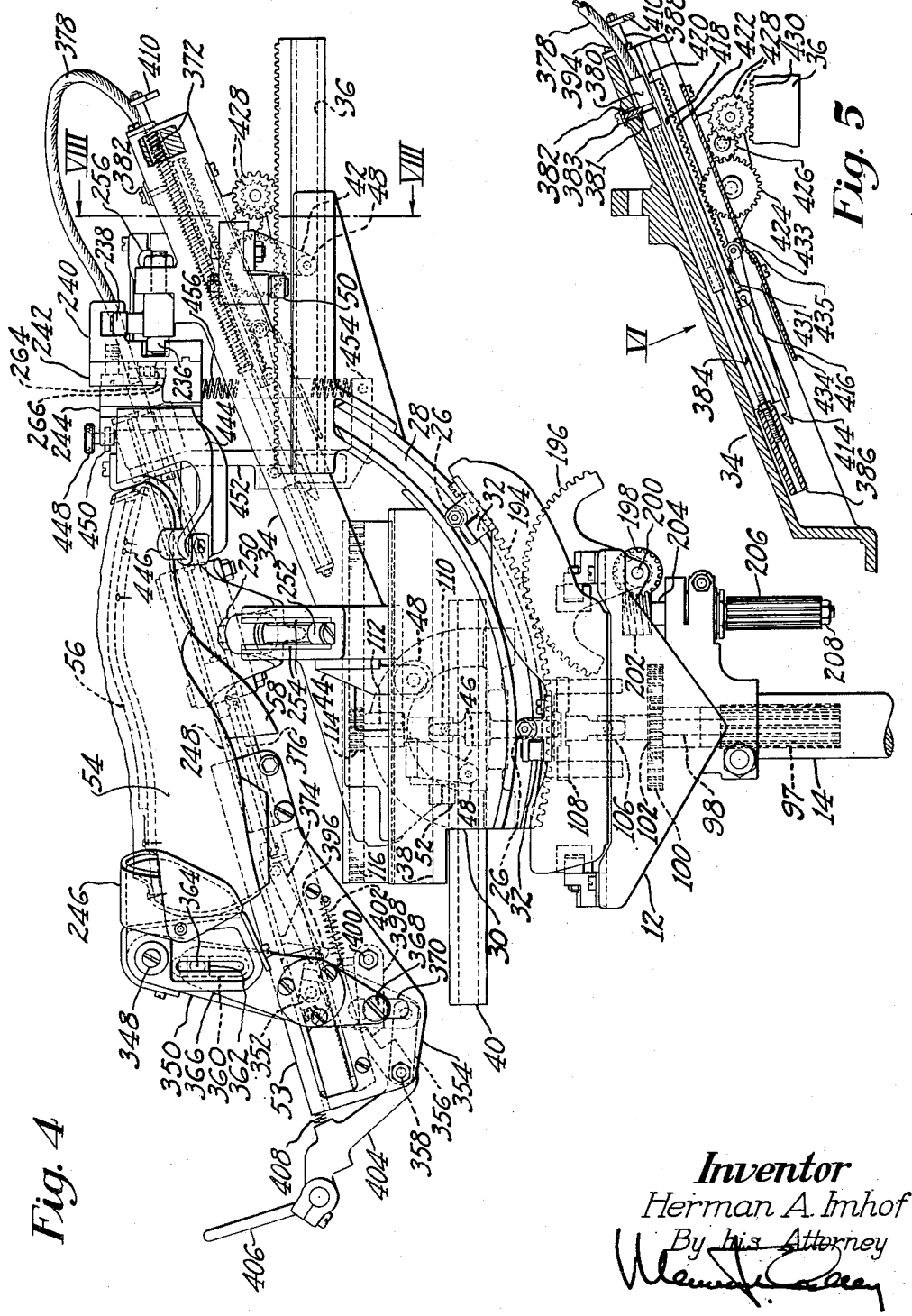

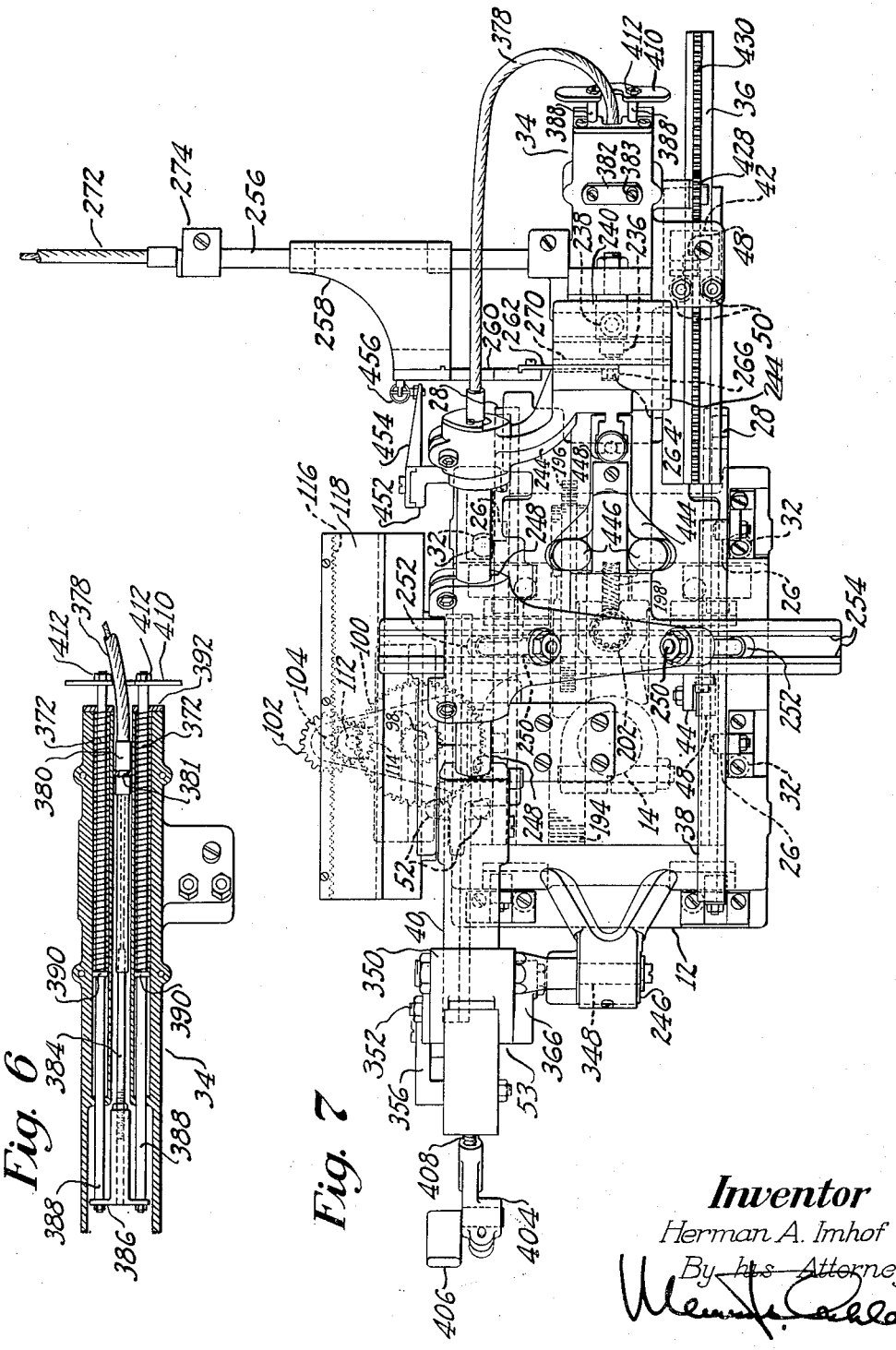

*Inventor*
*Herman A. Imhof*
By his Attorney

Inventor
Herman A. Imhof
By his Attorney

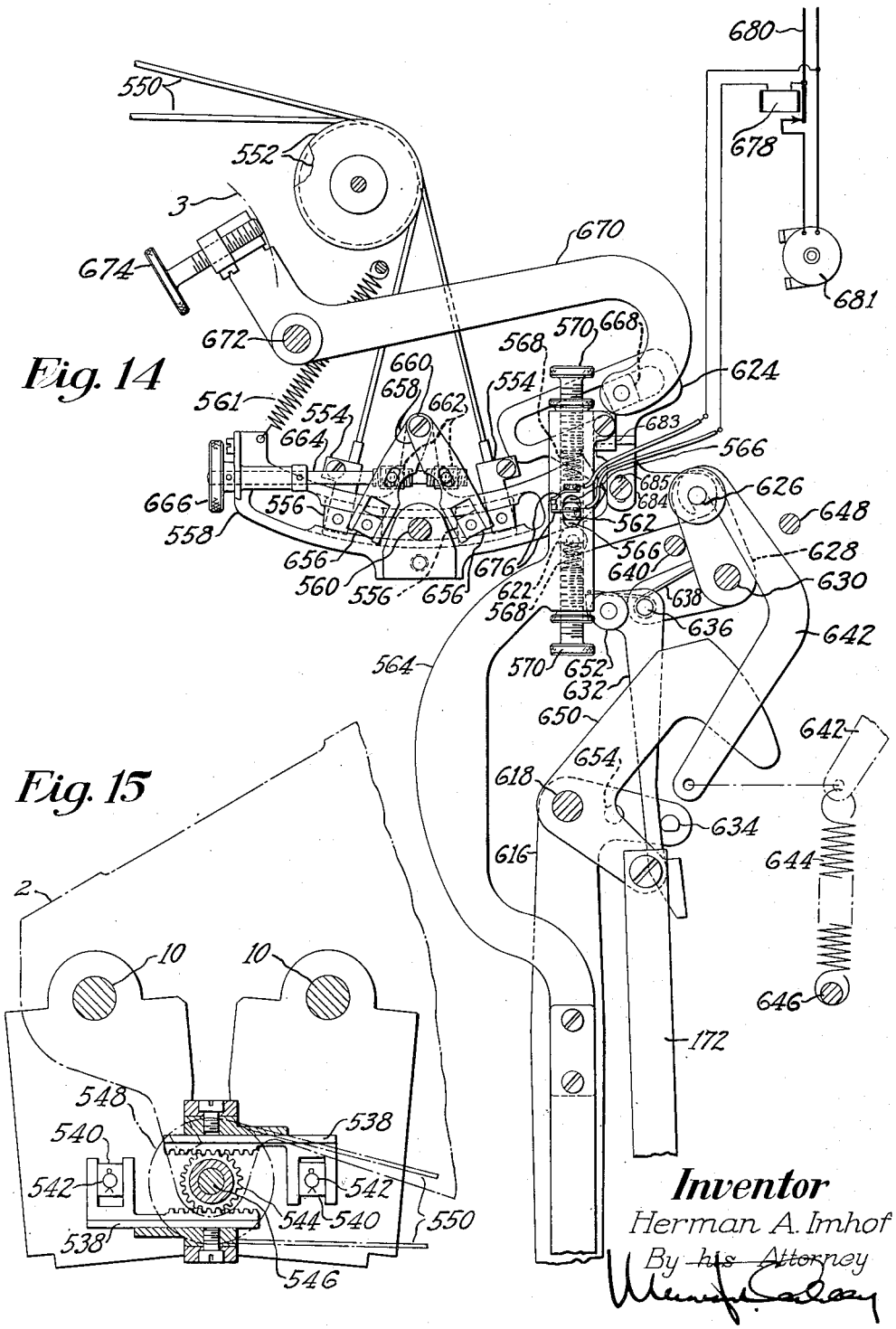

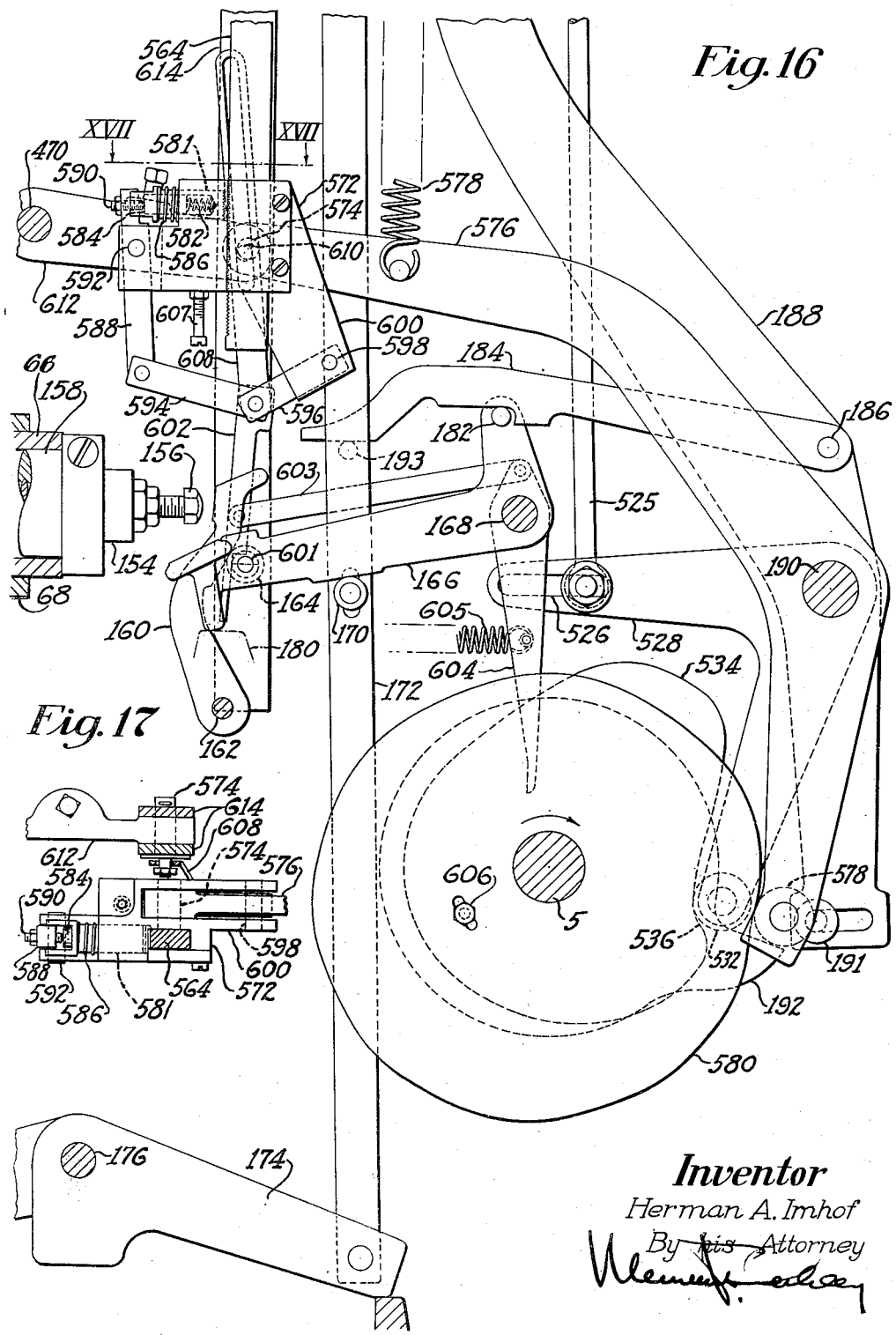

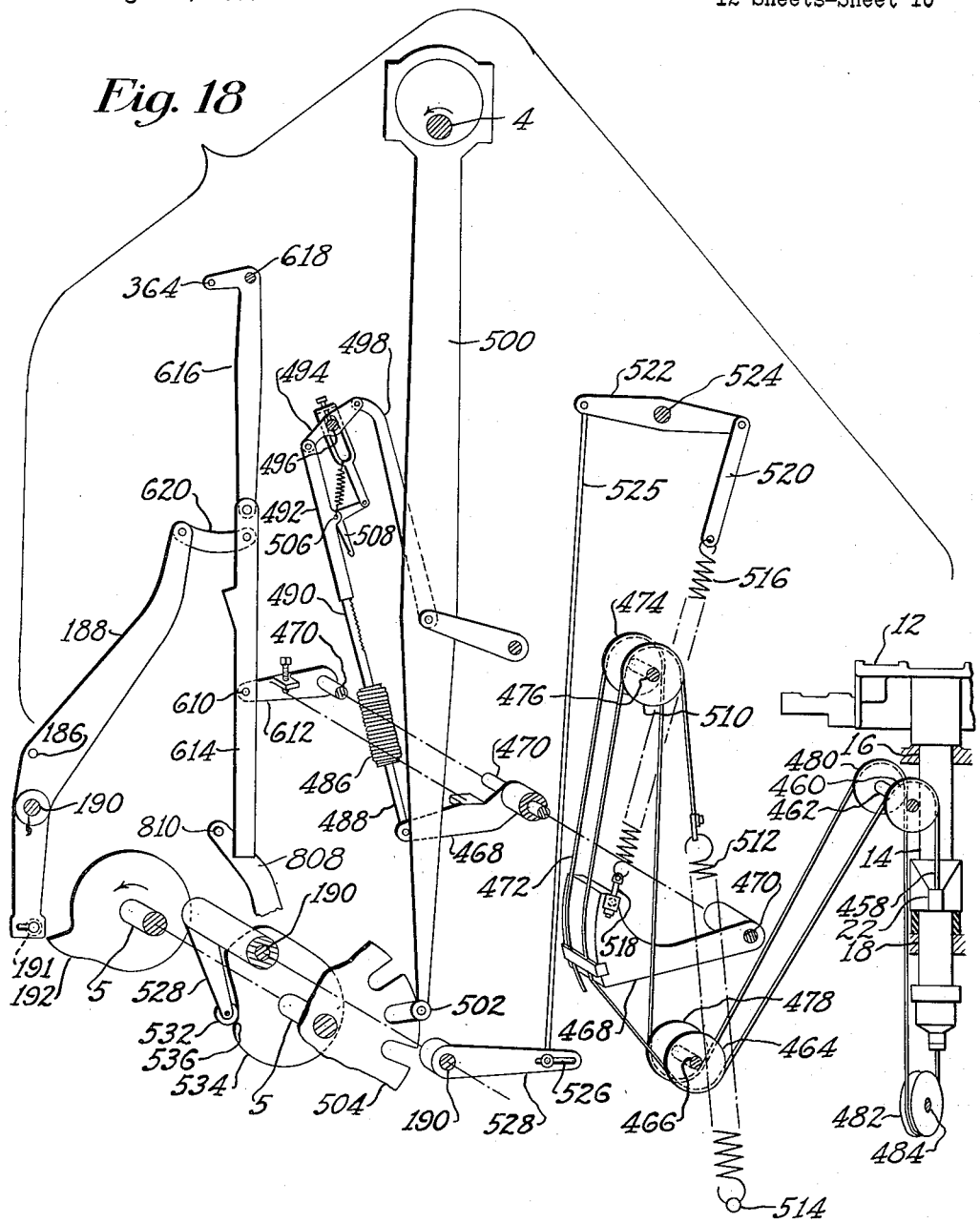

Dec. 1, 1953     H. A. IMHOF     2,660,739
MACHINE FOR USE IN MANUFACTURE OF SHOES
Filed Aug. 30, 1950     12 Sheets-Sheet 11

Inventor
Herman A. Imhof
By his Attorney

Dec. 1, 1953  H. A. IMHOF  2,660,739
MACHINE FOR USE IN MANUFACTURE OF SHOES
Filed Aug. 30, 1950  12 Sheets-Sheet 12

*Inventor*
Herman A. Imhof
By his Attorney

UNITED STATES PATENT OFFICE 2,660,739

MACHINE FOR USE IN MANUFACTURE OF SHOES

Herman A. Imhof, Beverly, Mass., assignor to United Shoe Machinery Corporation, Flemington, N. J., a corporation of New Jersey Application August 30, 1950, Serial No. 182,230

35 Claims. (Cl. 12—10.3)

The present invention relates to automatic machines for use in the manufacture of shoes, and is herein illustrated as embodied in an automatic side lasting machine of the type in which operating devices act simultaneously along opposite marginal portions of a shoe, in a manner disclosed in United States Letters Patent No. 1,722,502, granted July 30, 1929, No. 1,999,298, granted April 30, 1935, and No. 2,201,866, granted May 21, 1940, all on application of Robert H. Lawson, and No. 2,489,416, granted November 29, 1949, upon application of the present inventor. In these machines a shoe is presented progressively to the operating devices and is positioned partly by power actuated mechanisms and partly by direct engagement with abutments on the operating devices. It is to be understood, however, that certain features of the invention are well adapted for use in automatic machines other than lasting machines, in which the operating devices act simultaneously along opposite marginal portions of a shoe or in lasting machines which are not fully automatic in the positioning movements imparted to a shoe during its presentation to the operating devices.

In the machine of Patent No. 1,722,502 the operating devices act to last progressively, the opposite marginal portions of a shoe supported upon a jack and means is provided for actuating the jack to impart proper relative feeding and positioning movements to the jack during a lasting operation. The means for feeding and positioning the jack includes power driven mechanism having a pattern cam shaft for moving the shoe lengthwise and in other respects. Included in the prior patented positioning means, which are not driven by power, are a pair of spaced shoe guiding abutments comprising presser feet or channel engaging anvils arranged to be yieldingly separated from each other so that they will be maintained in continuous engagement along the surface inside the rib of an insole as the shoe is fed and a stationary foot acting on the flat surface of the insole in cooperation with the channel engaging anvils to control the longitudinal tip or pitch motion of the shoe during feed, all three of the feet requiring direct upward pressure of the shoe against them to impart the proper motion to the shoe.

The machine of Patent No. 1,722,502, operates efficiently at relatively low speeds but, if the speed of operation is increased substantially, the pressure required to hold the shoe against the stationary abutment foot becomes excessive so that frictional resistance to movement along the feet interferes with the feed and other positioning motions imparted to the shoe. For this reason, the construction of the machine of that patent has been changed to provide additional power driven mechanism in place of the stationary abutment foot. Such power driven mechanism is disclosed in Patent No. 2,201,866 and is intended to impart the longitudinal tip or pitch motion to the shoe, the stationary foot having been eliminated in the machine of that patent. In applying the additional power driven mechanism to that machine, however, the construction and arrangement of the shoe supporting jack has been modified to provide more space both for the additional mechanism and for greater accessibility in making adjustments and replacements of worn parts.

The shoe supporting jack of Patent No. 2,201,866 has enabled greater speed of operation and has simplified servicing the machine but at the same time has, in turn, introduced difficulties in the way of inaccurate operations where an attempt is made to last shoes having either excessive lengthwise curvatures in the plane of the shoe bottom or having high arches, as in women's shoes. These difficulties primarily result from improper coordination between the feed and pitch motions imparted to the shoe throughout a range of shoe sizes.

The lengthwise shoe feeding mechanisms only of the machines described in all the patents above referred to have adjustable connections to change the lengths of feed motions in accordance with the sizes of shoes operated upon. In the machine of Patent No. 2,201,866, the modified jack supporting structure comprises pivotally connected arms and links with feed and other connections in the mechanisms for moving the arms and links relatively to each other to impart both the feed and pitch motions to the shoe, the other connections being actuated by separate coordinated cams driven by the pattern cam shaft.

With adjustable connections in the feed mechanism only, any change in adjustment therein will not always cause accurate coordination of the feed motion with those motions imparted by the other connections, unless the change in feed adjustment produces a proportionate change in the other motions throughout the range of travel of the shoe between all successive points on the shoe. In the modified jack mounting structure of Patent No. 2,201,866, the pivotally connected arms and links of all the connections are subject to foreshortening action, so that a change in feed adjustment may cause an unproportionately short feed motion for the first few lasting operations and too long a feed motion for the remainder of the lasting operations. Thus, with a high arch shoe, where it is necessary to provide a quick pitch motion between the forepart and the shank, unless the lengthwise feed motion always brings the end of the shank accurately to the point of operation of the lasting units throughout the full range of feed adjustments, the quick pitch motion will occur too soon with extremely large shoes. As a result, the lasting units cannot act to tension the upper at right angles to the shoe bottom or to insert lasting fastenings in the right relation to the sewing rib of the insole and the channel engaging anvils may slip off the ribs, displacing them entirely from proper operating relationship with the shoe.

One object of the present invention is to avoid the difficulties encountered in improper lasting operations in a machine of the type referred to, as a result of inaccurate coordination between the lengthwise feed, pitch and other motions in a shoe when adjustments are made in the shoe feeding connections only. Another object is to provide a side lasting machine of the type referred to, with simply operated and readily controlled adjustable connections in its actuating mechanisms, such that a change in adjustment of one set of connections will not be reflected in the operation of another set, thus facilitating flexibility of operation when different types, styles and extreme sizes of shoes are operated upon.

A further object is to provide a shoe machine in which the desirable features of both the machines disclosed in the patents are combined into a unitary assemblage, avoiding the imperfections of both patented constructions.

An important feature of the invention, in pursuance of the above noted objects, resides in a construction of a side lasting machine generally similar to that disclosed in the patents referred to, having a main base, operating devices provided with a pair of shoe guiding and engaging abutments acting along the marginal portions of a shoe bottom, at opposite sides of a center line running between the marginal portions, a jack frame on the base, and shoe supporting means on the frame including one or more arcuately movable carriages, preferably guided about intersecting axes, one of the axes passing transversely to the length of the shoe and an additional carriage guided for rectilinear feed motion lengthwise of the shoe on one of the arcuately guided carriages, in which separate mechanisms driven by a pattern cam shaft are provided for actuating both the feed carriage and the arcuately guided carriage which supports it, to insure presentation of the shoe properly to the operating devices under all conditions of adjustment in the feed mechanism. As herein disclosed, the arcuately guided carriage on which the feed carriage is mounted is movable to impart a pitch motion to the shoe about an axis running transversely to the length of the shoe through the points of engagement of the guiding abutments with the shoe. Any change in adjustment of the connections in the mechanism for actuating the feed carriage corresponding to a change in shoe size will, with this arrangement, have no undesirable reaction in the form of a substantial component motion in the arcuately guided pitch carriage. To promote this result further, the reaction of one carriage motion on another is minimized by providing an irreversible drive in the connections for the pitch carriage. Such arrangement prevents reaction on the pattern cam shaft through the pitch mechanism. To reduce the effects of friction and mass in the relatively moving parts of the jack and shoe supporting means and to provide less opportunity for these effects to be reflected from one mechanism to another, in accordance with this feature, the feed and pitch mechanisms are so constructed that they act at different times in each operating cycle.

Further features of the invention reside in improvements in mounting the shoe supporting means on the jack frame, a construction being provided such that a better balance will be obtained between the pressures against the shoe bottom of the respective guiding means as the operation progresses than in prior machines of this type. In the preferred form of this latter feature, components of forces applied to the shoe by the guiding means tending to displace the shoe from proper operating position are substantially nullified.

These and other features of the invention, including improvements in jack raising, unit spreading and turning and lasting gripper actuating mechanisms, as hereinafter described and claimed, will readily be apparent from the following detailed description and accompanying drawings, in which, Fig. 1 is a view in left side elevation of an automatic shoe side lasting machine embodying the features of the present invention;

Fig. 2 is a sectional plan view taken along the line II—II of Fig. 1;

Fig. 4 is a view in front elevation on an enlarged scale of the jack and a shoe thereon, of the machine of Figs. 1 and 3;

Fig. 5 is a sectional view of the shoe clamp releasing mechanism in the jack;

Fig. 6 is a plan view in section of the parts illustrated in Fig. 5, as viewed in the direction of the arrow VI of that figure;

Fig. 7 is a plan view of the jack with the shoe removed;

Fig. 8 is a sectional detail view on a further enlarged scale taken along the line VIII—VIII of Fig. 4;

Fig. 9 is a detail view of the mounting block for the shoe supporting cradle, partly broken away to illustrate a cradle shifting connection;

Fig. 10 is a plan view of the bottom of a shoe of extreme curvature which may be operated upon successfully in the present machine;

Fig. 14 is a detail view on an enlarged scale of a portion of the lasting unit spreading mechanism with a spring displaced to the right for clarity of illustration;

Fig. 15 is a sectional detail view of another portion of the unit spreading mechanism;

Fig. 16 is a detail view in right side elevation of parts of the unit spreading mechanism, the jack supporting toggle actuating cam lever and the auxiliary jack raising cam lever in the machine;

Fig. 17 is a sectional view of a part of the mechanism illustrated in Fig. 16 as seen from the line XVII—XVII;

Fig. 18 is a detail perspective view with some of the jack supporting parts broken away and in separated relation to illustrate more clearly the arrangement thereof;

Figure 3:
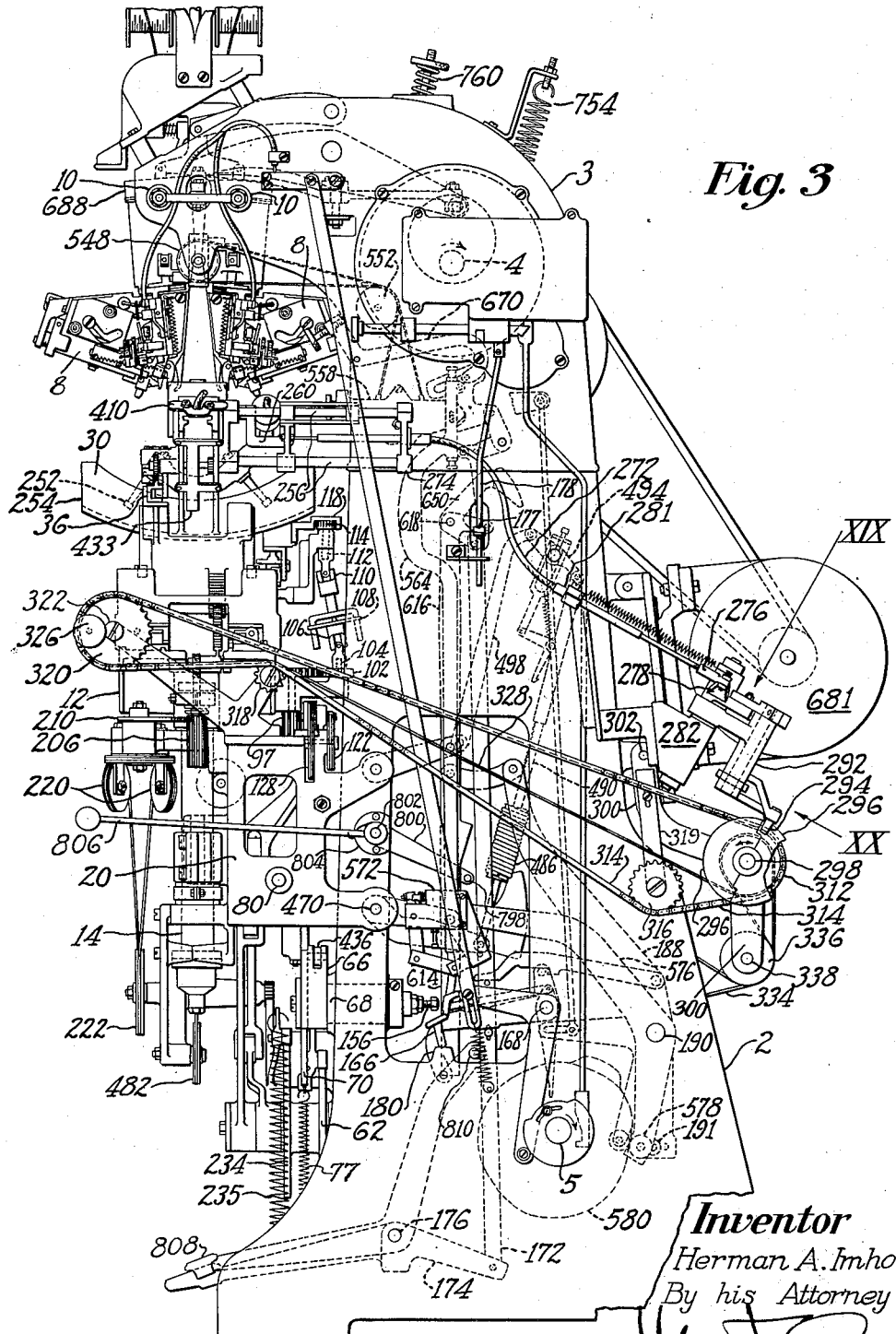
Fig. 3 is a view in right side elevation of the machine.

The machine illustrated in the drawings is an automatic shoe side lasting machine having a main hollow base or frame 2, two sets of lasting units comprising upper tensioning and fastening devices pivotally mounted for swinging movement toward and from each other in a head 3 of the machine mounted on the frame 2. The lasting units are arranged to act simultaneously and progressively along opposite marginal portions of a shoe. These units, except as hereinafter described, are provided with rib-engaging abutments and are the same in construction and mode of operation as the units disclosed in United States Letters Patent No. 2,418,140 granted April 1, 1947, upon joint application of Charles A. Robinson and the present inventor, as well as being generally the same as those disclosed in the patents hereinbefore referred to. The machine also has a jack provided with shoe supporting and clamping means which is moved step-by-step to feed the shoe during the lasting operations and to present portions of the shoe upper along the sides of the shoe successively to the upper tensioning and fastening devices and which is mounted on the main machine frame 2. For actuating the upper tensioning and fastening devices, the illustrated machine is provided with an operating cam shaft 4 in the head 3 and for presenting the shoe on the jack properly to the lasting units, power driven mechanism is incorporated in the machine including main and auxiliary pattern cam shafts 5 and 6 rotating in unison in the main frame 2. To enable all the cam shafts to be driven in proper timed relation to each other the operating cam shaft 4 is connected through driving mechanism to the main pattern cam shaft 5. A stopping mechanism driven in part by the operating shaft 4 and in part by the main cam shaft 5 is actuated after the completion of the operations on the shoe to perform certain auxiliary operations and to bring the machine to rest with the shoe released and freed from the jack in a manner more fully disclosed in United States Letters Patent No. 2,489,416, granted November 29, 1949, and No. 2,589,392, granted March 18, 1952, both in the name of the present inventor. The machines of the patents referred to are arranged to cause the shoe to be presented to the lasting units in part by the power driven mechanism, above mentioned and in part by the shoe bottom and rib engaging positioning abutments. For this purpose, the abutments comprise channel engaging presser feet or stapling anvils yieldingly pressed against the inner sides of opposite sewing ribs on the insole of a shoe as the shoe is fed. The lasting units are connected for equal movements in opposite directions so that they move toward and from a center line running along a shoe between the marginal portions of the shoe. In many instances this center line is a reverse curve and the shoe is moved transversely of its length to accommodate the curvature of the center line, the lasting units being guided for operation at opposite sides of the center-line.

Figure 12:
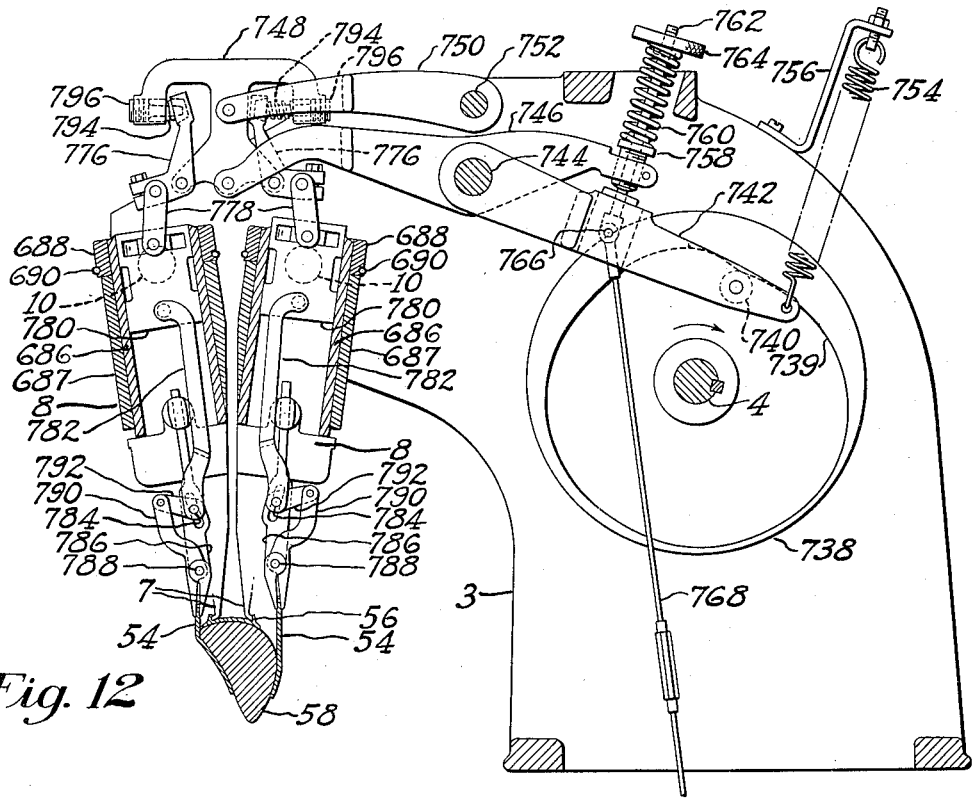
Fig. 12 is a detail view of the upper tensioning gripper actuating mechanism in the machine.

Referring more particularly to Fig. 12 of the drawings, the abutments or feet are indicated at 7, each carried by a support for one of the lasting units indicated at 8, pivotally mounted at 10 on the head 3. The abutments 7 cause the shoe to roll about a lengthwise axis as it is fed besides causing the lasting units to move toward and from each other as the width of the insole varies along its length.

In the machine of Patent No. 1,722,502 an additional shoe positioning abutment is provided comprising a stationary foot secured to the head of the machine in proper position to bear against the shoe bottom between and at the rear of the rib engaging abutments. The stationary foot serves with the rib engaging abutments to maintain the shoe bottom at the point of operation of the lasting units in a substantially horizontal plane, the stationary foot causing the shoe to pitch about an axis transverse to the length of the shoe passing through the points of engagement of the rib engaging abutments with the shoe sole.

While such arrangement is effective for relatively slow speeds of operation and where relatively flat bottom shoes are operated upon, it has been found more advantageous to impart the pitch motion to the shoe by power driven mechanism rather than by a stationary shoe engaging and positioning abutment. This purpose has been effected in the machines of the patents above-identified, other than No. 1,722,502, but in so doing the jack supporting structure has been modified in a manner which in some instances introduces difficulty in adjusting and properly controlling the machine.

In all the machines of the patents, except No. 1,722,502, referred to there are provided automatic adjustments for regulating a power driven feed motion of the shoe to correspond with the size of the shoe operated upon. Due to the construction of the jack supporting structure in the machine of Patents Nos. 1,999,298 and 2,201,866 employing power driven pitch mechanism, certain components of feed motion are required to be incorporated in the pitch mechanism and certain components of pitch motion in the feed mechanism. Accordingly, when adjustments are made in the feed mechanism only, the timed relation of the corresponding components of feed motion incorporated in the pitch mechanism may not be maintained exactly at all times during operation of the machine. With improper timing between the feed and pitch motions and their respective components, proper presentation of a shoe to the lasting units is rendered extremely difficult for a full range of shoe sizes particularly with deep shank shoes, which require quick pitch motions.

In accordance with the present invention, the jack supporting structure and the power driven mechanisms therefor are so arranged that substantially no component of motion need be incorporated in one mechanism for correcting the motion imparted by any other mechanism and the mechanisms for actuating the jack are so constructed that the timed relation of one mechanism always will correspond throughout the motion imparted thereby to similar motions imparted by the other mechanisms. The motions thus are properly coordinated in a predetermined manner, such that with an adjustment in the overall length of feed motion corresponding proper motions are insured at the requisite times with all the other mechanisms, separate adjustment not being required. By such arrangement proper presentation of the shoe is possible with a full range of shoe sizes. Furthermore, any one of the jack actuating mechanisms may be adjusted independently of the other mechanisms much more simply than with prior machines.

The shoe supporting means on the jack illustrated in the drawings includes a jack frame 12, secured to a vertically movable spindle in the form of a tube 14, slidingly mounted in bearings 16 and 18. The bearings 16 and 18 are formed in a bracket 20 bolted to the main machine frame 2. To prevent rotation of the spindle in its bearings it has clamped to it an arm 22 (see particularly Fig. 11) projecting to the left of the spindle and entering within a closely fitting groove 24 in a forwardly projecting lug on the bracket 20. The jack frame is movable with its spindle vertically to raise and lower the shoe toward and from operating position.

To enable a pitch motion to be imparted to the shoe by rotation about an axis extending transversely of the length of the shoe and passing through the points of engagement with the rib engaging abutments on the shoe bottom, the jack frame carries two pairs of rolls 26 (see Figs. 4 and 7) entering arcuate slots 28 for guiding a pitch carriage 30. The slots 28 are formed in a part of the carriage 30, one slot being formed in each side of the carriage to provide a wide base of support. To maintain proper alinement of the pitch carriage, the sides of the carriage along the slots 28 bear against rolls 32 rotatable about vertical axes supported by the jack frame. For the feed motion, the pitch carriage has mounted on it for rectilinear motion lengthwise of the shoe, a feed carriage 34 with shoe being retained thereon against relative lengthwise movement. To guide the feed carriage, the pitch carriage has three spaced parallel guideways 36, 38 and 40.

As has been stated, a feature of the invention relates to the use of separate mechanisms driven by the bottom cam shaft 5 for actuating the pitch and feed carriages, there being no interconnection and essential components of the motion imparted to one carriage are not imparted by the mechanism for the other carriage. Thus, the pitch and feed motions are kept separate and are properly coordinated regardless of the adjustment of the feed actuating mechanism. To support the feed carriage in the guideways 36, 38 and 40, it has fastened thereto three brackets 42, 44 and 46 to which are secured horizontal studs for antifriction rolls 48, one on each bracket. To prevent lateral displacement of the rolls 48 from their guideways, the bracket 42 carries a pair of vertically disposed rolls 50 engaging opposite sides of the guideway 36 and the feed carriage 34 carries a pair of spaced vertically disposed rolls 52 engaging opposite sides of the guideway 40 on the pitch carriage.

Besides lengthwise pitch and feed motions, a shoe on the jack has imparted to it a motion of roll about a lengthwise axis and a transverse balancing motion to insure substantially equal pressures of the shoe engaging abutments 7 on the shoe. The roll motion is not imparted by power actuated mechanism but by direct engagement of the abutments with the shoe. To guide the roll motion of the shoe on the jack, the feed carriage 34 has pivotally mounted upon it for rocking movement about the lengthwise axis of the shoe, a shoe balancing cradle or carriage 53 constructed and mounted in a manner similar to that disclosed in Patents No. 2,489,416 and No. 2,589,392, the shoe being releasably clamped on the cradle. The shoe on the cradle has an upper 54 and a ribbed insole 56 supported upon a last 58 (see Figs. 10 and 12). The center line of the shoe is indicated at 57, in Fig. 10.

Figure 21:
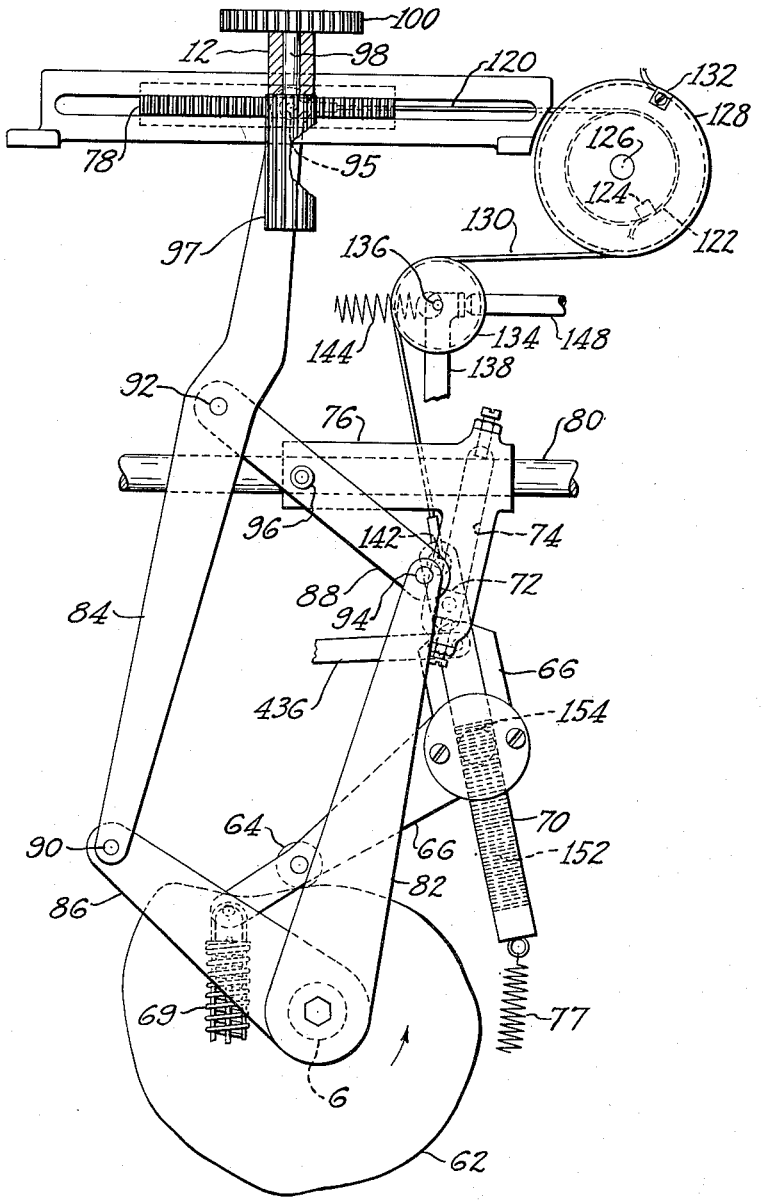
Fig. 21 is a detail view of the feed slide actuating and feed adjusting mechanism.

The mechanism for imparting to the feed carriage a straight line motion lengthwise of the shoe, as in the machines of prior Patents Nos. 1,999,298, 2,201,866 and 2,589,392, is actuated from one of the two pattern cam shafts 5 and 6 geared at 60 (Fig. 1) for simultaneous rotation together in the main frame 2 of the machine. The feed cam, indicated at 62, is secured to the projecting end of the pattern cam shaft 6 beneath the jack supporting structure and is engaged by a cam follower roll 64 (Fig. 21) carried by a lever 66 having an integral hub rotatably mounted in a bearing formed in a boss 68 in the main frame of the machine (see Figs. 3 and 11). The cam roll 64 is pressed yieldingly against the cam 62 by a spring 69 connected between the lever 66 and a lug on the machine frame. Before operation of the machine, the lever 66 is rotated about its fulcrum and the rotation of the lever transfers an automatically adjustable feed motion to the carriage 34, which motion is uniform throughout the range of travel of the lever with any size adjustment of the connections.

For the purpose of adjusting the feed motion automatically, an upwardly extending arm of the lever 66 has a guideway within which a slide bar 70, comprising a variable effective length arm on the lever 66 is movable in a direction radially of the fulcrum of the lever. The upper end of the bar 70 has pivotally mounted on it a block 72 slidingly mounted in an inclined slot 74 of a feed carriage driving slide 76. The lower end of the bar has connected to it a tension spring 77 for drawing the bar yieldingly downwardly. The bar 70 when moved relatively to the lever 66 increases or decreases the movement imparted to the slide 76.

The feed carriage driving slide 76 is operatively connected to the feed carriage through a uniform ratio linkage and a driven slide 78 mounted for spaced parallel movement in a guideway on the bracket 20. The driving slide 76 has a horizontal sleeve-like portion slidingly mounted on a rod 80 secured at its ends in lugs on the bracket 20, the slide being located between the lugs.

The uniform ratio linkage for the feed motion is in the form of a parallelogram comprising a link 82 rotatably mounted at the outer end of the pattern cam shaft 6 and a lever 84 disposed in parallel relation to the link 82 but spaced therefrom by links 86 and 88 also disposed in parallel relation. The members of the parallelogram are maintained in their parallel relationship by pivotal joints 90, 92 and 94 between them including the outer end of the cam shaft 6, on which the link 82 is rotatably mounted, the joint 92 connecting the link 88 at an intermediate location on the lever 84 so that the upper end of the lever 84 is pivotally connected at 95 to the driven slide 78 and the driving slide 76 is connected to the parallelogram by means of a pivot 96 on the link 88 between its ends at a location which will enable the two slides to move along their guideways without causing excessive frictional forces to be applied to the members of the parallelogram.

The driven feed carriage slide 78 has formed on its forward surface rack teeth engaging an elongated vertically disposed pinion 97 (see Fig. 21) secured to the lower end of a shaft 98 rotatable in bearings in the jack frame 12. At the upper end of the shaft 98 is a large spur gear 100 meshing with a smaller gear 102 (Fig. 7) secured to a short shaft 104 rotatably mounted in a rearwardly projecting lug on the jack frame. Above the gear 102 is a universal joint 106, best shown in Figs. 1 and 2 and connected with a sliding torque transmitting coupling 108. The upper end of the coupling 108 is in turn connected to a universal joint 110 having its uppermost member secured to a shaft 112 rotatable in a lug projecting rearwardly from the pitch carriage 30. The upper end of the shaft 112 carries a spur gear 114 meshing with a rack 116 (see Fig. 7) secured to an overhanging flanged plate 118 projecting from the feed carriage 34. Movement of the driven slide 78 rotates the pinion 97 and the gears driven thereby to move the feed carriage lengthwise of the shoe without imparting any component of motion to the pitch carriage.

Figure 11:
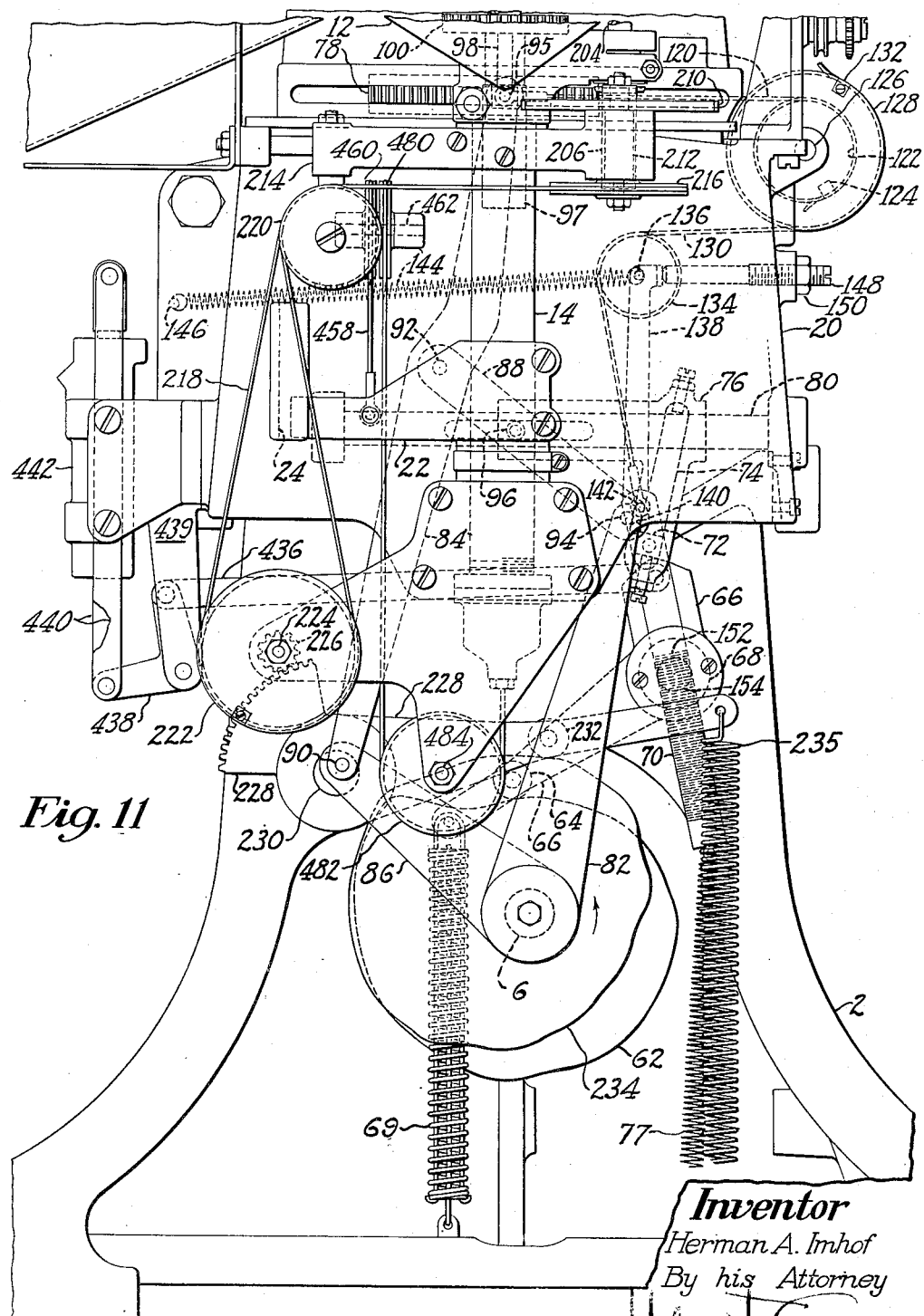
Fig. 11 is a view in front elevation of a portion of the supporting structure for the jack.

The adjustment of the feeding mechanism is accomplished automatically, as in the machine of Patent 1,999,298, merely by bringing a shoe on the jack into proper starting position relatively to the lasting units. The movement of the shoe jack to bring the shoe into operating position shifts the slide 78 and transmits a length changing motion of the slide through connections to be described, to the variable length bar 70. These connections are illustrated in Fig. 11 and comprise a flexible cable 120 fast at one end to the pivot 95 on the slide 78 and at the other end carried about a pulley 122. The extreme end of the cable on the pulley is secured thereto by a clamp 124 and the pulley is rotatably mounted on a fixed pin 126 with a larger pulley 128 having wound about its periphery a second cable 130 secured thereto by a clamp 132. The cable 130 runs horizontally from the lower edge of the pulley 128 to an idler pulley 134 rotatably mounted on a pin 136 at the upper end of an arm 138 pivoted at 140 on the bracket 20. From the pulley 134, the cable 130 extends downwardly and is fastened to a pin 142 at the upper end of the slide bar 70. The arrangement is such that as the jacked shoe is moved in the direction of feed to bring it into proper operating position at the start of a lasting operation, the connections thus described between the feed carriage and the slide bar on the variable length arm of the lever 66 automatically bring the slide bar to the proper adjusted position against the tension of spring 77. The slide bar is then locked in adjusted position and the operation on the shoe is started.

To prevent the cable 130 from becoming disengaged from the grooves in the pulleys 128 and 134, the pivot 136 on the arm 138 is connected to a spring 144 stretched between the pivot and a pin 146 on the bracket 20. As the operation on the shoe progresses, the spring 144 moves the arm 138 away from an adjustable stop rod 148 threaded into the bracket 20 to keep a steady tension on the cable. The stop rod 148 is in the form of a set screw having a lock nut 150 to retain it in adjusted position.

To lock the slide bar 70 in adjusted position when the operation on the shoe is started the slide bar along its innermost surface has cut therein a series of teeth 152 engaged by corresponding teeth at the inner end of a yielding two-part plunger 154, shown more clearly in Fig. 16, having projecting rearwardly therefrom an adjustable screw 156. The plunger 154 is slidingly mounted within a hollow sleeve 158 journaled in the hub of the cam lever 66, the hub of the cam lever being rotatably mounted in the boss 68.

Cooperating with the adjustable screw 156 in the plunger 154 to lock the bar 70 is a cam arm 160 rotatably mounted on a pin 162 fixed in the machine frame. The cam arm 160 has an inclined surface along its rearward edge engaged by a roll 164 carried by a horizontal arm of a lock actuating lever 166. The lever 166 is fulcrumed on a shaft 168 fixed in the machine frame and is raised to press the cam arm 160 against the adjustable screw 156 on the lock plunger by the engagement along the under surface of the horizontal arm on the lever 166 with a pin 170 adjustably secured in a vertical treadle rod 172.

The treadle rod 172 is pivotally connected at its lower end with a starting treadle lever 174 fulcrumed on a pin 176 in the base of the machine. At its upper end, as shown in Fig. 3, the treadle rod 172 engages a block 177 secured to a rod 178 of the driving and stopping mechanism, the block projecting through a slot in the machine frame. The driving and stopping mechanism is the same as disclosed in United States Letters Patent No. 2,423,852, granted July 15, 1947, upon application of C. A. Robinson and the present inventor.

Before starting the machine in operation on a new shoe, the slide bar 70 is unlocked ready for readjustment of the shoe feeding motion in accordance with the size of the new shoe, the bar being drawn downwardly by the spring 77. For this purpose, the horizontal arm of the lock actuating lever 166 is rocked downwardly in a counterclockwise direction to cause the cam arm 160 to be disengaged from the screw 156 on the locking plunger. In rocking downwardly the horizontal arm of the lever 166 is brought to rest in engagement with a lug, indicated by the dot-dash lines 180 (see Fig. 16) on the frame of the machine.

To rock the horizontal arm of the lock actuating lever 166 downwardly at the end of the lasting operations on a shoe the vertical arm thereof carries a pin 182 engaged by a shoulder on a releasing arm 184. The releasing arm 184 is pivotally mounted at 186 on a cam lever 188 fulcrumed on a cross shaft 190 in the machine frame. The cam lever 188 has adjustably clamped to its lower end a roll 191 actuated by a cam 192 on the main pattern cam shaft 5. The cam 192 is shaped to act through the connections described to unlock the size adjusting slide bar 70.

In order that lock actuating lever 166 may be actuated to lock the slide bar 70 in size adjusted position in starting the machine, the treadle rod 172 has mounted upon it a pin 193 against which the extreme forward end of the releasing arm 184 rests. When the treadle rod 172 is raised in starting the machine the pin 193 raises the shoulder on the releasing arm from engagement with the pin 182 on the lock actuating lever 166 before the lever 166 is moved substantially.

To prevent lasting pressures on the shoe engaging abutments from reacting adversely on the pitch mechanism, in the illustrated machine, irreversible drive connections are provided in the pitch mechanism comprising an arcuate rack 194 on the pitch carriage 30, a gear sector 196 meshing with the rack 194 and formed integrally with the hub of a worm wheel 198, rotating on a shaft 200 secured in the jack frame 12. Engaging the teeth on the worm wheel 198 is a low pitch worm 202. The worm 202 is mounted on a shaft 204 rotating in a vertical bearing in the jack frame 12 and having at its lower end an elongated pinion 206 clamped by a nut 208 to the shaft 204 (see Fig. 4) and engaged by a driving gear sector 210 (see also Figs. 1 and 3). The gear sector 210 is keyed to the upper end of a vertical shaft 212, shown in Fig. 11, rotating in a bearing in a bar 214 bolted to the bracket 20. At the lower end of the shaft 212 is a grooved wheel 216 surrounded by a flexible cable 218 actuated in turn by connections driven from the main pattern cam shaft 6. After leaving the wheel 216, the cable passes over and downwardly from a pair of concentric pulleys 220 rotatably mounted on the bracket and the ends of the cable are secured to the periphery of a grooved wheel 222 fixed to the forward end of a horizontal shaft 224 rotating in the bracket. At the rearward end of the shaft 224 is a spur gear 226 engaging a sector projecting from the hub of a cam lever 228. The cam lever is fulcrumed on a stud 230 secured in the main frame 2 of the machine. The cam lever 228 has a roll 232 engaging a cam 234 on the auxiliary cam shaft 6. To hold the cam roll against the cam a spring 235 is stretched between the lever and the machine frame. The worm 202 (Fig. 4) is rotated a large number of times for a small rotation of the worm wheel 198 preventing any tendency for the wheel 198 to drive the worm 202. Thus, the reaction of the lasting units on the shoe cannot readily be transferred through the connections of the pitch actuating mechanism beyond the worm and worm wheel.

To prevent the feed motion imparted to the shoe from reacting on the pitch mechanism, the feed cam 62 and the pitch cam 234 (Figs. 11 and 13) are cut with steps and alternate dwells. These cams are secured to the auxiliary cam shaft 6 in such angular relation that the steps of the respective cams are disposed in out-of-phase time relation. When the toe of the shoe is lowered the pitch motion is imparted to the shoe first and the feed motion after the pitch motion is completed. When the toe is raised, the sequence of pitch and feed movements is reversed. Such timing also avoids the necessity of feeding the shoe upwardly against the downward pressures of the abutments 7, the feed carriage being inclined.

Figure 13:
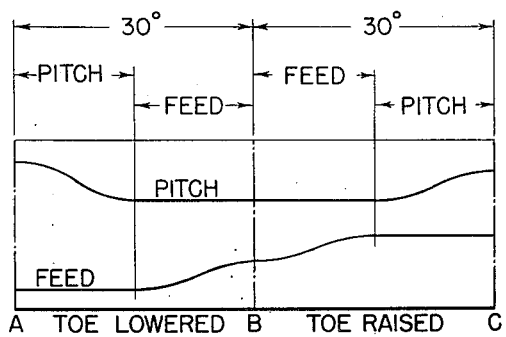
Fig. 13 is a time chart illustrating two successive lasting cycles of operation including the shoe pitch and feed motions.

The operation of the pitch and feed cams will more readily be understood by reference to Fig. 13. This figure illustrates the time relation of the pitch and feed motions imparted to the jack between three successive lasting operations, indicated in the figure by the designations A, B and C. The first illustrated motion of the jack from A to B requires 30° rotation of the pattern cam shaft between successive lasting operations with the shoe thrown into a position in which the toe is lowered below the heel. The pitch motion is imparted first, the pitch carriage 30 moving about an axis passing through the points of engagement of the abutments 7 on the shoe bottom transversely to the length of the shoe. After the pitch motion has been completed the feed motion is started, causing the shoe to slide downwardly along the abutments the distance between successive lasting operations. Due to the frictional engagement of the abutments with the shoe there may be a substantial reaction on the jack supporting structure. However, this reaction will not affect the pitch motion of the shoe for the reason that the downward force of the abutments on the shoe is applied substantially at the center of pitch motion. Further, the irreversible drive in the pitch mechanism prevents reaction on the pitch cam of the pattern cam shaft from this cause.

It is possible to retain these beneficial results regardless of the direction of pitch motion. In the first 30° of rotation of the pattern cam shaft from A to B the pitch motion is illustrated as being imparted in a direction to bring the shoe into a position with the toe lowered and in the second 30° rotation of the pattern cam shaft from B to C the pitch motion is imparted in the opposite direction to raise the shoe toe above the heel. However, when the feed carriage is pitched downwardly at the toe end, the feed motion is imparted last as indicated from A to B. When the toe end is raised the pitch motion is imparted last as from B to C, the feed always occurring in the same direction between successive lasting operations, with no undesirable reactions being produced in either instance.

In the machine of prior Patent No. 2,489,416, the shoe balancing cradle supporting the shoe is guided for arcuate movement about a pivotal mounting axis intersecting the axis of the pitch carriage and extending lengthwise of the shoe. The cradle rocks about the pivotal mounting for the cradle to balance the forces applied to the shoe by the abutments of the lasting units. As the lasting operation progresses the cradle is shifted on its pivotal mounting. In the machine of that patent a cradle shifting countershaft is mounted directly in the frame of the jack so that the connections between the cradle and the jack frame will be as simple and direct as possible. In the machine of the present invention the parts of the jack structure are somewhat heavier and provide less opportunity for the location of the auxiliary cradle-balancing countershaft. Accordingly, in the machine of the present invention the cradle-balancing countershaft is rotatably mounted on the main machine frame 2 and the mechanism for shifting the cradle includes a Bowden wire actuated connection to the jack.

The illustrated cradle balancing mechanism enables the shoe engaging abutments 7 to act with substantially equal pressures along a shoe at opposite sides of a reversely curved center line, such as illustrated at 57 in Fig. 10, running between the marginal portions defined by the sewing ribs of the insole on the shoe bottom (see Patent No. 1,999,298). As in the machine of Patent No. 2,489,416 the pivotal mounting for the present illustrated cradle 53 extends lengthwise of the shoe and comprises angularly disposed pivot rolls 236 and 248 on the feed carriage 34 engaging slots in a guideway block 240. The block 240 is mounted on a second block 242 bolted to it and provided with an integral offset arm 244 on which the toe rest of the shoe clamping means is mounted.

The shoe clamping means is directly mounted on the balancing cradle 53 and comprises a heel clamp in the form of a V-block 246 mounted for movement toward and from the toe rest. Connecting the heel clamp with the toe rest is a hollow inclined bar 248 provided with mounting studs 250 on which are rotatable pressure rolls 252 disposed between a pair of guideway plates 254 on the feed carriage. The rolls 252 and the plates 254 serve with the rolls 236 and 238 and the block 240 to provide a cantilever mounting on the feed carriage for the heel support end of the cradle. By shifting the cradle transversely of the length of a shoe on the shoe supporting means, the center about which the cradle rocks is changed.

To shift the cradle transversely of the shoe length in a manner to resist components of heightwise pressure on a shoe, the feed carriage has projecting rearwardly therefrom, adjacent to the toe rest, a pair of parallel bars 256 (see Figs. 3, 4 and 7). Mounted on the bars 256 is a slide or yoke 258 having clamped thereto a U-shaped plate 260 with its forward end connected to a strap 262. On the free end of the strap is a roll 264, best shown in Figs. 8 and 9. The roll 264 engages a slot 266 in the block 242 extending heightwise of a shoe on the cradle. The heightwise slot 266 enters the block 242 from a side opening 268 therein. The roll engaging slot in the block 240 is formed transversely to the length of a shoe on the cradle as in the prior machine so that with the added heightwise slot 266 for the roll 264, downward pressure applied to the shoe and cradle is distributed between the rolls 236 and 264 as the cradle rolls on its pivotal mounting. As the cradle rolls about its pivotal mounting the division of downward pressure on the rolls may change, with the result that positive location of the cradle is determined transversely of the shoe length even when operating upon shoes requiring excessive rolling movement of the cradle.

To reduce the horizontal component of downward pressure applied to the roll 264 as the shoe is rocked about the roll 236, the transverse slot, indicated at 270, in which the pivot roll 236 rides, extends parallel to the bottom of the shoe and is curved upwardly somewhat at its ends. This form of curvature is selected as a result of analysis in operation of the machine on shoes of varying curvatures which require shifting movement of the cradle transversely to the length of a shoe in a direction to bring the downward pressure on the roll 236 more nearly normal to the upper surface of the transverse slot 270.

Figure 19:
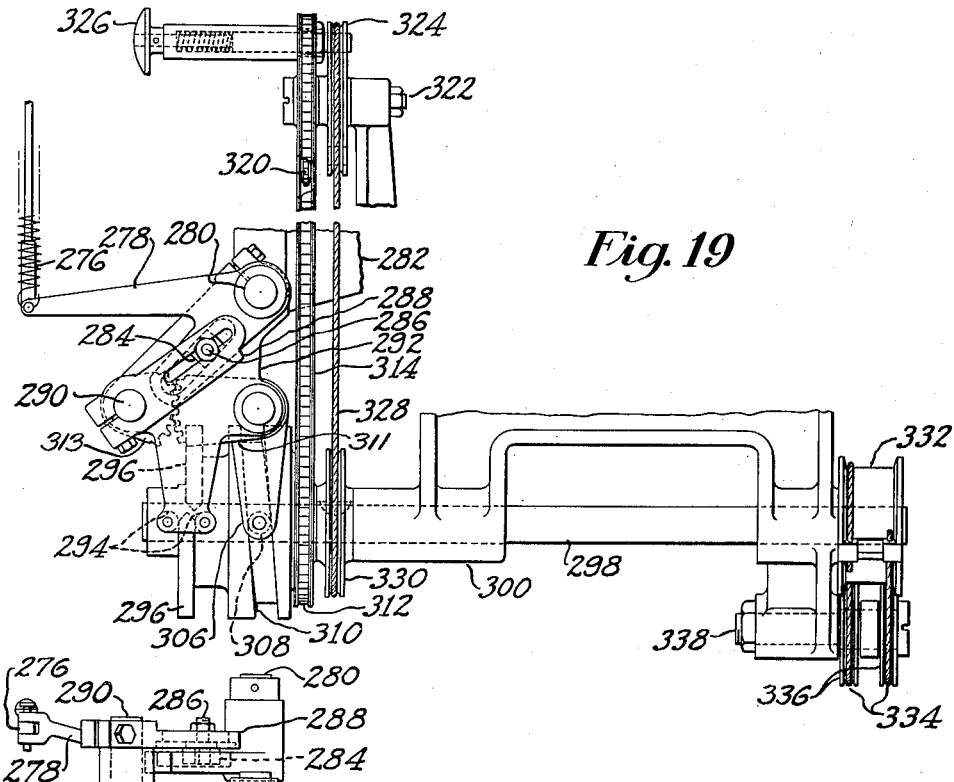
Fig. 19 is a view of the cradle shifting and balancing mechanism on an enlarged scale as viewed in the direction of the arrow XIX in Fig. 3.
Figure 20:
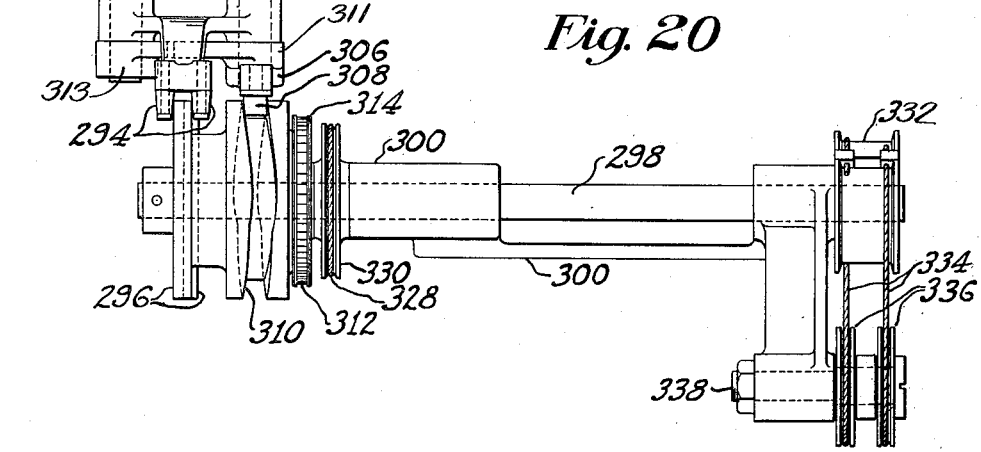
Fig. 20 is a view of the same mechanism looking in the direction of the arrow XX of Fig. 3.

The Bowden wire actuated connection for shifting the cradle 53 transversely of the shoe length is indicated at 272 and is connected to the slide or yoke 258. The sheath of the Bowden wire is connected to a brace 274 clamped to the rearward ends of the bars 256. The Bowden wire connection runs rearwardly and downwardly and terminates in a socket 276 pivotally connected to one arm of a V-shaped carriage shifting lever 278 fulcrumed on a shaft 280 (see Figs. 19 and 20) secured in an inclined position to a block 282 made fast to the frame 2 of the machine. The sheath of the Bowden wire 272 is also clamped to the machine frame at 281, shown in Fig. 3.

Referring again to Figs. 19 and 20, the other arm of the carriage shifting lever 278 has a lengthwise groove into which fits a block 284 through a central perforation of which extends the lower end of a bolt 286 adjustably clamped in turn to a slotted arm 288. The arm 288 is secured to the upper end of a shaft 290 rotatably mounted in a bearing at one corner of a triangular fulcrum supporting member 292. The member 292, in turn, serves as a lever rotatable on the shaft 280 below the lever 278. The member 292 also has a projecting arm carrying a pair of frusto-conical rolls 294 engaging side surfaces of one of a pair of semi-circular collars 296 having a hub loosely fitting the cradle balancing shaft in the form of a horizontal countershaft 298. The countershaft 298 is rotatably mounted below the block 282 in a bracket 300 secured to the machine frame through an upwardly projecting portion mounted on a pin 302 (see Fig. 3) passing through ears extending rearwardly from the machine frame. To prevent the bracket 300 from rotating about the pin 302, the upwardly projecting portion of the bracket 300 has threaded in it a bolt 303, securing it to the rearward surface of a motor support plate 304 (see Fig. 1).

The semi-circular collars 296 act to change the limits of transverse movement imparted to the cradle and the feed carriage while balancing the downward pressures of the shoe engaging abutments along the center line running between the marginal portions of the shoe bottom, in a manner similar to corresponding collars disclosed in Patent No. 2,489,416. In the machine of this patent, the collars are relatively adjustable but such adjustment has been found unnecessary in the present machine.

To shift the pressure balancing cradle transversely of the shoe on its pivotal mounting in the feed carriage as the center line of the shoe curves in the illustrated machine, a third corner of the frame 292 (Figs. 19 and 20) has a bearing in which is rotatably mounted a stud formed integrally with a cam lever 306 having a roll 308 engaging a slot in a cradle balancing cam 310. The cam 310 is also formed integrally with the hub of the collars 296.

To transfer the motion of the cam lever 306 to the carriage shifting lever 278 the hub of the lever 306 has projecting from it a gear segment 311 meshing with a similar segment 313 secured to the lower end of the shaft 290. The motion of the cam lever 306 is thus transferred through the gear segments 311, 313 to the arm 288 and to the carriage shifting lever.

For rotating the collars 296 and the cam 310 the hub of the collars and cam carries a sprocket 312 (see Fig. 3) about which passes a link chain 314. The link chain is guided along its lower side by idle sprockets 316 and 318 on a strap 319 clamped to the bracket 300 and on the bracket 20, respectively. At the front of the machine the chain 314 passes around a cradle transverse movement reversing sprocket 320 rotating on a shoulder bolt 322 clamped in a forwardly projecting arm of the bracket 20. On the bolt 322 is also rotatably mounted a pulley 324 disconnectably coupled to the sprocket 320 through a spring-pressed locking plunger 326. To rotate the pulley 324 it is surrounded by a cable 328 engaging a grooved wheel 330 (see Figs. 19 and 20) keyed to the shaft 298, the shaft being rotated through connections with a cam on the pattern cam shaft 5.

During operation of the machine on a shoe, the cam 310 is rotated slightly less than 180° and after the operations are completed the cam is returned to its starting position, the rolls 294 engaging the same semi-circular collar 296. For a right shoe one half of the cam is effective to move the roll 308 and for a left shoe the opposite half of the cam is effective. The shape of the cam 310 along the respective halves is such as to reverse the transverse cradle balancing movement. The semi-circular collars 296 are offset axially for shifting the fulcrum member to cause the cradle to be moved transversely a fixed distance when the cradle balancing movement is reversed for right or left shoes.

To reverse the cradle movement when changing from a right to a left shoe the locking plunger 326 is retracted from engagement with the pulley 324 and the sprocket 320 is rotated, relatively to the pulley 324, 180° to bring the opposite portion of the cam 310 into engagement with the roll 308. After relative rotation of the sprocket 320 the locking plunger 326 engages an opening in the pulley 324, 180° removed from the opening originally engaged thereby.

To rotate the cradle balancing shaft 298 during operations of the machine its end opposite the cam 310 (Figs. 19 and 20) carries a drum 332 to which is clamped the ends of a cable 334 carried about the drum in opposite directions. From the drum the cable 334 passes downwardly about a pair of pulleys 336 rotating on a shoulder bolt 398 carried by the bracket 300. From the pulleys 336 the cable passes about a drum 340 (see Fig. 1) rotatably mounted in the machine frame and actuated in a manner described more fully in Patent No. 2,201,866. Briefly the drum 340 is rotated in one direction by a cam lever 342 actuated by a cam 344 on the shaft 5 and in the other direction by a spring 346 connected at one end to the drum and at the other end to a fixed stud.

To actuate the shoe clamping means in the cradle the heel clamp block 246 is pivotally mounted at 348 on an offset arm 350 mounted for rocking movement on a bolt 352 passing through a slot in a block 354 clamped to the heel end of the inclined bar 248. The arm 350 has a downward extension pivotally connected to a link 356, in turn rotatable on a pivot 358 in the block 354. For moving the heel clamp block toward and from the toe rest the bolt 352 is movable in the slot of the block 354 and when the clamp block engages the heel of a shoe the bolt is locked in position in the slot by a ratchet and pawl device more fully described in Patent No. 2,489,416.

To insure a level position as it moves toward and from the toe rest the heel clamp block 246 has a vertical slot 360 within which is slidingly mounted a block 362 rotatable on a pin 364 carried by an arm 366 secured to the bolt 352. A downward extension of the arm 366 carries a stud 368 entering a slot 370 in the block 354. The operation of the arms 350 and 366 is similar to that of corresponding arms disclosed in Patent No. 2,489,416.

To move the shoe heel clamp block 246 toward the toe rest the bolt 352 is operated yieldingly by a pair of springs 372 (see Fig. 6) mounted in the feed carriage 34 through connections including a Bowden wire. In the machine of Patent No. 2,489,416 a corresponding spring is mounted in the jack frame and actuated by the cam which shifts the cradle transversely of the jack frame to balance the forces of the shoe engaging abutments. In some instances the arrangement of the patented machine for rotating the cradle shifting and balancing cam does not impart a motion of sufficient length at the proper time for actuating the shoe clamping spring.

To improve the operation of the shoe heel clamp block both for clamping the shoe and for resetting the heel clamp actuating springs 372 after the shoe is released, the present machine has connections actuated by the springs 372 and located in an inclined portion of the feed slide 34. These connections extend to the guideway for the feed carriage and are actuated during relative movement between the feed carriage and its guideway. These connections include a spring actuated link 374 operatively connected with the bolt 352, a rod 376 pivotally connected to the link 374, the Bowden wire above referred to, and shown at 378, the central member of which is connected to the rod 376 and the sheath of which is connected at one end to the hollow inclined bar 248 in the cradle, the other end of the sheath being connected to a grooved collar 380 in the feed carriage (see Fig. 6). The grooved collar 380 has an elongated tubular extension and is secured to the feed carriage by a fin 381 (see Fig. 5) projecting through a slot in the feed carriage from a plate 382. The plate 382 is secured to the feed carriage by screws 383. Slidingly mounted in the extension of the collar 380 is a push rod 384 connected to the central member of the Bowden wire 378 with its lower end threadedly connected to a block 386. The block 386 has lugs, best shown in Fig. 6, at either side of the rod 384 which have threaded therein the lower ends of a pair of rods 388 slidingly mounted in the inclined portion of the feed slide in parallel relation to the rod 384. The rods 388 are each surrounded by one of the springs 372 which are compressed between collars 390 on the rods and a plate 392 secured at the upper end of the inclined feed slide arm. The plate 392 has perforations to receive the rods 388 and is secured to the feed slide by a pair of screws 394 (see Fig. 5).

The springs 372 act through the Bowden wire and other connections to move the heel clamp 246 toward shoe clamping position but are restrained from so doing by an angularly disposed link 396 (Fig. 4) surrounding the bolt 352 for the heel clamp and a latch 398 pivoted on a pin 400 in the cradle block 354. The latch 398 has an upwardly extending projection acted upon by a spring 402 stretched between the projection on the latch and a pin in the block 354. To enable the heel clamp block to clamp a shoe the latch 398 is engaged by an actuating lever 404 rotatably mounted on the pivot 358 in the block 354 and provided with a handle 406 clamped to the lever, the lever being normally held in operative position by a spring 408 compressed between it and the block 354.

At the upper ends of the spring supporting rods 388 (Figs. 6 and 7) they are connected together by a U-shaped brace 410 having laterally projecting ears to assist in manual operation. The brace is secured to the rods by clamp nuts 412 threaded on the rods. Withdrawal of the rod 388 by grasping the brace 410 compresses the springs 372 and through the Bowden wire and other connections to the heel clamp disengages the clamp block 246 from a shoe. Manual disengagement of the clamp block from the shoe may thus be accomplished at any time in the operation of the machine after the operating parts have been brought to rest.

After releasing the shoe at the end of the lasting operations thereon, the shoe clamp releasing connections are disconnected. For this purpose the block 386 at the lower ends of the rods 388 is engaged at its lowermost corner by a latch 414 (see Fig. 5) pivotally mounted at 416 on a slide 418. The slide is retained in a guideway 420 within the inclined portion of the feed slide and acts to prevent escape of the grooved collar 380 from proper position in the feed slide. The slide 418 has along its lower surface a series of rack teeth 422 engaged by a pinion 424 rotatable in the feed slide 34. The pinion 424 meshes with an idler 426 in turn meshing with the smaller of a pair of connected gears 428 rotatably mounted in the feed slide. The larger of the pair of connected gears engages rack teeth 430 projecting upwardly from the feed slide guideway 36. With this construction the latch 414, during lasting operations on a shoe, moves downwardly toward the lower corner of the block 386 and engages it, being pressed toward engagement with the block by a compression spring 431 disposed between the slide 418 and an arm of the latch. After the lasting operations have been completed the feed slide is returned to its starting position. After the latch 414 engages the lower corner of the block 386 it carries the block upwardly to disengage the heel clamp from the shoe. The shoe then drops by gravity from the jack in a manner more fully set forth in Patent No. 2,489,416 as the feed slide returns to its starting position.

The heel clamp link 396 is latched to retain the shoe heel clamp in retracted position by the latch 398 and the latch 414 is then disengaged from the block 386. For this purpose, the latch 414 has at its right end a roll 433 engaging a cam plate 434 secured to the underside of the feed slide. The cam plate 434 has a rise portion 435 properly located to accomplish the desired result.

In returning the feed slide to its starting position in preparation for operations on a new shoe, a comparatively rapid motion is imparted to the feed slide, the cam roll 64 engaging at this time a relatively steep portion of the feed actuating cam 62 (see Fig. 11). To prevent destructive impact at this time and to retard it during the return feed slide motion the cam lever 66 is pivotally connected at its upper end by a link 436 connected with an elbow lever 438 pivotally mounted on a downwardly projecting arm of a sub-frame 439 on the bracket 20. The elbow lever 438, in turn, is connected to a pair of links 440 extending upwardly at either side of a snubber comprising a hydraulic cylinder 442 secured between projecting flanges of the sub-frame 439. The cylinder contains a piston connected to the links 440 for retarding the return feed motion.

For the purpose of supporting a shoe in the most desirable operating position vertically on the cradle, the toe rest is mounted on the block 242 in vertically adjustable relation. The block 242 has for this purpose a T-shaped guideway engaging correspondingly shaped surfaces of a toe rest block 444. The toe rest block has laterally projecting arms provided with toe engaging pads 446 and is threaded to receive a thumb screw 448 passing through a slot in a projecting portion of the block 242. The slot in the block 242 is grooved to receive a collar 450 on the thumb screw so that the thumb screw will be retained in vertical position while being rotated to cause the toe rest block 444 to slide on the block 242.

To balance the weight of the offset portions on the cradle so that the shoe will initially be presented to the lasting units in level position, the inclined bar 248 has projecting rearwardly from it an arm 452 (see Fig. 7). Secured to the arm 452 is a brace 454 connected at its end with a spring 456 stretched between the brace and a pin carried by the yoke 258.

In the machine disclosed in Patent No. 2,589,392, a shoe on the jack is held in raised operating position against the shoe engaging abutments 7 of the lasting units by three yielding members, one of which is actuated intermittently to press the shoe against the abutments before each lasting operation, another of which counterbalances all of the weight of the shoe and jack except that amount required to cause the shoe to drop slowly away from the abutments when the operations are completed and the third of which is continuously stressed to provide a light upward pressure of the shoe on the abutments during feeding movements between successive operations on the shoe. At the end of the operations on the shoe a toggle, to be referred to hereinafter, acts to extend the third yielding member, the first yielding member already having been rendered inoperative. In extending the third yielding member after the first yielding member has been rendered inoperative, connections including a jack raising cable are released, allowing the shoe and jack to drop downwardly away from operating position. With the use of the modified form of jack supporting structure employed in the machine of Patent No. 2,589,392, the mass of said structure is such that desirable results are obtained without producing objectionable impacts or reactions on the actuating mechanisms. However, in the jack structure of the present invention the parts are heavier and the forces required to move them are greater so that the mechanism for raising the jack structure must be arranged to prevent sudden impacts particularly at the end of lasting operations on a shoe while lowering the jack to disengage the shoe from the lasting units.

The jack raising mechanism of the present invention includes a cable 458 connected to the arm 22 on the jack spindle tube 14 (see Figs. 11 and 18). The cable 458 passes upwardly over a pulley 460 rotatable on a shaft 462 mounted on the bracket 20. The cable 458 extends downwardly from the pulley 460 beneath a pulley 464 rotatable on a shaft 466 in the main frame 2 of the machine. From the pulley 464 the cable extends upwardly and is secured to an arcuate surface on an arm of a lever 468. The lever 468 has a tubular hub through which passes a shaft 470. The shaft 470 is rotatably mounted in lugs inside the machine frame 2.

To prevent lost motion between the jack spindle tube 14 and the lever 468 while a shoe is being disengaged from the lasting units the arcuate surface of the lever 468 also has secured to it a cable 472 passing upwardly over a pulley 474 rotatable on a stud shaft 476 in the main frame 2, downwardly beneath a pulley 478 rotating on the shaft 466, upwardly about a pulley 480 rotating on the shaft 462 and downwardly beneath a pulley 482 rotating on a shoulder bolt 484 secured to a downwardly projecting arm of the bracket 20. From the pulley 482 the cable passes upwardly to the lower end of the jack spindle tube 14. The use of the cables 458 and 472 causes the spindle tube 14 to move in unison with the lever 468 with no lost motion between them and no opportunity for relative impact.

The jack raising mechanism, according to a feature of the present invention, has three yielding members, as in the machine of Patent No. 2,589,392, but instead of maintaining a continuous stress on the third yielding member to provide a light upward pressure of the shoe on the abutment, and to cause it to be stressed still further in disengaging the shoe at the end of the operations, additional mechanism is provided in the present machine which acts through the said third yielding member at the end of the operations without stressing it further to diminish the pressure of the shoe on the abutment gradually to a point just sufficient to maintain the shoe in operating position. By acting through the third yielding member at the end of the lasting operations, the forces in the jack raising mechanism are reduced rather than increased as in the jack mechanism of Patent No. 2,589,392. Also the stress on the third yielding member being lessened, its stiffness is correspondingly reduced and the shoe disengaging movement of the jack is correspondingly softened. Preferably, the mechanism for lessening the stress of the third yielding member gradually is actuated by a cam on the pattern cam shaft.

The first of the three yielding members for raising the jack is actuated intermittently to press the shoe against the abutments on the lasting units and to diminish the pressure thereon. This first yielding member acts on the lever 468 (see Fig. 18) and comprises a spring 486 stretched between a link 488 pivotally connected to an arm of the lever 468 and a ratchet bar 490 slidably mounted in a channeled link 492. The link 492 is pivotally connected to an arm of a lever 494 mounted on a cross shaft 496 in the main machine frame. The lever 494 is also pivotally connected to a link 498 in turn pivotally connected to a vertically movable lever or pitman 500 driven by the main operating cam shaft 4, the lower end of the pitman carrying a roll 502 which cooperates with a Geneva wheel 504 on the main pattern cam shaft 5. The channeled link 492 has pivotally mounted upon it at 506 a pawl lever 508 acting in a manner more fully described in United States Letters Patent No. 2,430,889, granted November 18, 1947, upon application of C. A. Robinson and the present inventor. During the operation of the machine the spring 486 is tensioned intermittently to increase the pressure of the shoe on the abutments and to enable the shoe to be fed without excessive frictional force being applied to the shoe engaging abutments. Between the intervals of increased pressure the pawl lever 508 disengages the ratchet bar 490 and renders the spring 486 inoperative.

To counterbalance all of the weight of the jack and shoe thereon except that amount required to enable the shoe to drop slowly from the abutments when the operations are completed the cable 456 passes upwardly over the arcuate surface on the lever 468 to a pulley 510 rotating on the shaft 476 and downwardly to the second yielding member in the form of a spring 512 stretched between the cable 456 and a pin 514 in the machine frame 2.

The third yielding member for raising the jack and shoe maintains a light upward yielding pressure of the shoe on the shoe engaging abutments while the first yielding member is inoperative and comprises a spring 516 stretched between an eye bolt 518 secured to the lever 468 and a link 520. The link 520 is pivotally connected to a lever 522 fulcrumed on a shaft 524 in the machine frame. Also pivotally connected to the lever 522 is a downwardly extending link 525 having its lower end adjustably clamped in a slot 526 in an arm of a cam lever 528. The cam lever 528 is fulcrumed on the cross shaft 190 carried by the main frame 2 and has a cam roll 532 engaging a pattern cam 534 on the main pattern cam shaft 5. Rotation of the cam 534 causes the spring 516 to be stressed or relaxed to maintain upward pressure of the shoe on the shoe engaging abutments 7 in compensation for the curvature of the shoe bottom.

According to a further feature in the machine, the jack raising mechanism is operated to enable a particularly desirable impact-free jack depressing action. The cam 534 has a short radial portion 536 arranged to diminish the pressure of the shoe against the abutments to a point just sufficient to maintain the shoe in operating position at the end of the operations upon the shoe with no substantial pressure on the abutments. This action of the cam 534 through the spring 516 avoids possibility of imparting shocks or sudden movements to the jack raising mechanism so that when the toggle, to be described, for depressing the jack from operating position is straightened, no substantial impact or rebound occurs.

To prevent continued operation of the machine after an improper lasting operation after one or both abutments 7 are disengaged from the rib of an insole, in the form of invention hereinafter described, and to insure an effective guiding action on the abutments, the supports for the illustrated lasting units are actuated varying distances by a pattern cam to control and maintain the forces of their engagement with the sewing ribs substantially uniform as a shoe bottom varies in width along its length, and indicating means and a tripping device are provided which are set in operation to bring the machine to rest if the force resisting movement of the abutments apart is substantially reduced from that required in the prior patented machines. The illustrated lasting units are spread yieldingly as in prior machines but the yielding force is applied by much shorter and stiffer springs than heretofore employed. To spread the lasting units they are swung away from each other about their pivotal mountings 10, as shown in Figs. 1, 3 and 15. The lasting units each have a connection at either side with a pair of racks 538 formed with slotted ends engaging a block 540 rotatably mounted on a pin 542 projecting from either side of each lasting unit. The racks 538 engage the upper and lower teeth of a pair of pinions one of which is indicated at 544 in Fig. 15, secured to a shaft 546 rotatable in the head 3 of the machine. Connected with the shaft 546 is a pulley 548 (see Fig. 3) surrounded by the central part of a flexible cable 550 clamped to the pulley 548. The cable 550 extends rearwardly and downwardly about a pair of pulleys 552 rotatable in the machine frame and has its ends secured in clamps 554 best shown in Figs. 14 and 15. The clamps 554 are pivotally connected to arcuate slide blocks 556 mounted in an arcuate guideway formed in a unit separating lever 558. The lever 558 is centrally fulcrumed on a shaft 560 secured in the machine frame and is actuated in a clockwise direction, looking from the right, to separate the supports for the lasting units and in a counterclockwise direction to draw the supports together. To impart a preliminary spreading force to the abutments the separating lever is connected by one end of a tension spring 561, the other end of which is fastened to the head 3.

The unit separating lever 558 is actuated yieldingly in either direction during lasting operations by cam actuated mechanism to spread and to draw the supports for the lasting units together. Drawing the supports of the lasting units together at the end of the lasting operations brings the shoe-engaging abutments together to a position where they may enter between the sewing ribs of the smallest shoe intended to be operated on.

To actuate the unit separating lever 558 in either direction the lever has at its rearward end a pin 562 entering a slot at the upper end of a lock bar 564. The lock bar has slidingly mounted in the slot therein a pair of blocks 566 engaging the upper and lower sides of the pin 562. To cause the blocks to engage the pin they are pressed together by a pair of opposed springs 568 compressed against the blocks by thumb adjusting screws 570 disposed at either end of the slot in the lock bar. The adjusting screws 570, when rotated, vary the spread position of the supports for the lasting units at the start of the lasting operations. One of the springs 568 actuates the unit separating lever 558 in one direction to press the shoe-engaging abutments 7 yieldingly against the sewing ribs of a shoe and being of relatively short length and considerable stiffness do not impart sufficient yielding motion to the abutments to insure continuous contact throughout the length of the shoe with the lock bar held stationary. The other spring 568 tends to actuate the lever 558 in the other direction to draw the shoe engaging abutments together. To supplement the action of the springs 568 the lock bar 564 is actuated by a pattern cam.

To actuate the lock bar 564 of the unit spreading mechanism the lower end of the lock bar is disconnectably connected to a cam lever by a lock. The lock comprises the lower end of the lock bar which is serrated along one edge and is slidably mounted in a guide block 572 (see Fig. 16). The guide block 572 is pivotally connected at 574 to the upper end of the cam lever, indicated at 576. The cam lever 576 is urged upwardly by a spring 578 connected to a pin on the cam lever and the frame of the machine. The cam lever 576 is fulcrumed on the shaft 190 and has a cam roll 578 engaging its pattern cam, indicated at 580, on the cam shaft 5.

When the machine is at rest the connections of the unit spreading mechanism are disconnected and the abutments 7 of the lasting units are drawn closely together. Upon presenting a shoe to the lasting units the bottom of the shoe is brought into engagement with the abutments and the abutments are spread through the action of the spring 561, the lock bar 564 sliding in the guide block 572. Upon starting the lasting operations of the machine the bar 564 is locked to the guide block 572 and the cam lever 576 moves the unit separating lever in one direction or the other to insure proper engagement of the abutments with the sewing ribs on the shoe, the uppermost spring 568 providing a yielding pressure to the separating lever and causing yielding engagement of the abutments along the sewing rib. With a large size of shoe the lock bar is connected to the guide block 572 in one position and for a small sized shoe in another position. The locking action of the guide block on the block bar thus provides an automatic sizing adjustment for the unit spreading mechanism.

To lock the guide block 572 to the lock bar 564 before the lasting operations are started on a shoe the guide block has a horizontal passage to receive a locking plunger 581 having teeth cooperating with the serrations on the lock bar 564. The locking plunger 581 has a central opening within which is mounted a compression spring 582 retained in position by a button 584 which enters the opening in the plunger. The plunger also has shoulders which are engaged by a coil spring 586 compressed between the shoulders and the guide block 572. The spring 586 tends to disengage the locking plunger from the lock bar. To force the lock plunger against the lock bar the outer end of the plunger is slotted to receive the upper end of a lever 588 having a setscrew 590 therefor engaging the button 584. The lever 588 rotates on a pin 592 passing across a slot in the guide block within which slot the lever 588 operates and the lower end of the lever is pivotally connected to a link 594 forming a toggle with a link 596. The link 596 is pivotally connected at 598 to a plate 600 integral with the guide block 572. The central joint of the toggle 594—596 has pivotally connected to it a latch 602, the lower end of which is yieldingly held in engagement with a pin 601 about which the roller 164 rotates on the actuating lever 166 for the feed adjusting block. When the lever 166 is actuated to lock the feed adjusting slide bar 70 (Fig. 7) the latch 602 raises the central joint of the toggle 594—596 and forces the lock plunger 581 against the lock bar 564. The lock is actuated to lock the connection first and the feed locking plunger 154 is actuated thereafter to retain the feeding mechanism in adjusted condition. The unit spreading connections are retained locked together until the lasting operations on a shoe are completed. At the end of the lasting operations the lock plunger 581 is disengaged from the lock bar 564 to enable the lasting units to be restored to their starting position with the abutments 7 close together.

To disengage the latch 602 from the pin 601 at the end of the lasting operations the latch 602 is pivotally connected to a link 603, in turn connected to the upper end of a trigger lever 604 fulcrumed on the shaft 168. The trigger lever has a downwardly extending arm provided with a pin engaged by a tension spring 605 stretched between the pin on the lever and a fixed part of the machine. At the end of the lasting operations the downwardly extending arm of the trigger lever is engaged by a bolt 606 adjustably clamped within a slot in the cam 580 on the pattern cam shaft 5. Although the latch 602 is disengaged from the pin 601 the spring 586 is not able to retract the plunger 581 from the serrations on the bar 564, the weight of the toggle links 594, 596 not being sufficient to move them to a position of misalinement. To adjust the position of alinement of the toggle links 594—596 while locking the bar 564 so that they may not readily be misalined, the link 594 engages an adjustable setscrew 607 threaded into the block 572.

To unlock the lock bar 564 of the unit spreading mechanism the central joint of the toggle 594—596 is pivotally connected with an upwardly projecting slotted link 608. Passing through the slot of the link 608 is a pin 610 carried by an arm of a lever 612 which is actuated downwardly by a jack depressing toggle, to be described, at the end of the lasting operations on the shoe.

The jack depressing toggle comprises links 614 and 616 (see Figs. 3, 16 and 18) the latter of which is pivotally mounted on a shaft 618 on the machine frame. At the end of the lasting operations the central joint of the toggle links 614—616 is brought into alinement with the links through cam actuated mechanism. This mechanism includes a link 620 connected to the toggle link 614 and the cam lever 188. When the cam lever 188 is actuated at the end of the lasting operations the pin 610 engages the end of the slot in the link 608 and breaks the toggle 594—596 unlocking the lock bar 564.

To bring the abutments 7 of the lasting units together at the end of the lasting operations the unit separating lever 558 is engaged at its rearward end by a cam roll 622 carried by one arm of an H-shaped block 624. The H-block 624 is rotatably supported by a pin 626 mounted in the vertical arm of a bell crank 628. The bell crank 628 is fulcrumed on a fixed stud 630 and has pivotally mounted on its horizontal arm, a hook piece 632 yieldingly pressed at its lower hooked end against a pin 634 secured in a rearwardly projecting arm of the toggle link 616. To press the hook piece 632 against the pin 634 a pivot pin 636 forming the pivotal mounting for the latch piece on the bell crank 628 has coiled about it a spring 638, one end of which engages the hub of the bell crank 628 and the other end of which acts on the hook piece. When the toggle 614—616 is straightened at the end of the lasting operations the pin 634 engages the hook of the hook piece 632 and rotates the bell crank 628 to the position of Fig. 14. The bell crank 628 is retained in this position against a fixed pin 640 by the action of an angle link 642 having a hooked upper end engaging the pin 626 on the bell crank and a perforated lower end engaged by one end of a tension spring 644. The other end of the tension spring 644 is secured by a pin 646 on the machine frame. In moving to the position of Fig. 14 the bell crank 628 presses the roll 622 on the H-block 624 beneath the rearward end of the unit separating lever 558 to bring the lasting units in abutments 7 together. The spring 644 acts as an over-center snap device to hold the bell crank 628 in either of two positions against the pin 640 or at the opposite side against a fixed pin 648.

Before the lasting operations are started, the lasting units are allowed to separate until the abutments 7 engage the sewing ribs of a shoe. For this purpose, the upper end of the treadle rod 172 is pivotally connected to an arm of a cam plate 650 rotatably mounted on the shaft 618. The upper portion of the cam plate has a beveled surface merging into an arc concentric to the shaft 618, which surface and arc successively engage a roll 652 on a lateral projection of the hook piece 632. When the bevel surface of the cam plate engages the roll 652 the hook piece is disengaged from the pin 634 and is forced against a pin 654 on the toggle link 616. Continued movement of the cam plate forces the hook piece upwardly and rotates the bell crank 628 against the pin 648, disengaging the roll 622 on the H-block 624 from the unit separating lever 558. The spring 561 then spreads the lasting units to positions determined by the sewing ribs on the shoe to be operated upon.

For styles of shoes having substantial variation in width along the length of the shoe, the separation of the lasting units may be increased by adjusting the slide blocks 556 toward and from the fulcrum of the unit separating lever 558. To adjust the slide blocks in the unit separating lever the blocks are pivotally connected to perforated rectangular pieces 656 slidingly mounted in slots in two pairs of similar arms 658 rotatable on a shoulder screw 660 threaded into the machine frame. Midway along the length of each arm 658 is an elongated opening to receive a projection from two similar nuts 662 disposed between the arms 658 of each pair. One nut 662 is threaded with a right-hand thread and the other with a left-hand thread to be engaged by corresponding threads on a spindle 664 rotating in a bearing on the unit separating lever 558. The forward end of the spindle 664 carries a thumb wheel 666 for rotating the spindle and spreading or drawing together the blocks 556. Movement of the blocks 556 in the separating lever increases or decreases the unit spreading movement imparted to the flexible cable 559.

To prevent rotation of the H-block 624 about the pin 626 during movement of the bell crank 628 in bringing the lasting units together the upper portion of the H-block is slotted and has guided in its slot a block 668 to which is pivotally mounted a curved arm of a lever 670 rotatably mounted on a pin 672 secured in the machine frame. To hold the curved arm of lever 670 in predetermined position an upwardly extending arm of the lever has threaded therein a thumb screw 674 engaging a surface on the head frame 3 indicated by a dot-dash line in Fig. 14. Rotation of the thumb screw 674 causes the block 668 to be raised or lowered to change the separation of the abutments 7 on the lasting units when brought together.

To indicate accidental disengagement of a shoe engaging abutment 7 from the channel within the sewing rib of a shoe during lasting operations the indicating means comprising the connections and upper spring 568, above referred to, are actuated when the force resisting the compression of that spring is substantially reduced from normal. Ordinarily the tripping device is in the form of relatively stationary and movable switch contacts 676 secured to the upper end of the lock bar 564 and the pin 562, respectively, which pin is operatively connected to the uppermost spring 568. During normal lasting operations the uppermost spring 568 is compressed and acts to spread the abutments 7 of the lasting units into uniform engagement with the sewing rib of a shoe. If the abutments become disengaged from the sewing rib the compression of the uppermost spring 568 will be relieved and the lower movable contact will separate from the stationary contact to open the circuit of an electrical relay 678 connected thereto. The relay 678 is of the type having normally open contacts held closed magnetically to maintain circuit connections 680 for a main driving motor 681. The driving motor is indicated diagrammatically in Fig. 14 and its position on the main frame 2 of the machine is indicated more clearly in Figs. 1 and 3 of the drawings.

To insure that the circuit for the main driving motor 681 will remain closed while the machine is at rest so that operations may be resumed without delay and to bring the abutments 7 closer together a short distance so that they may fit readily within the rib of the smallest size of shoe to be operated upon in starting operations on a new shoe, the lock bar 564 has secured to its upper end a plate 683 having a ledge engaging the under side of a ledge on a corresponding plate 684 adjustably mounted on the H-block 624. The plate 684 has a vertical slot through which passes a clamp screw 685 arranged when loosened to enable vertical adjusting movement in the plate 684 relatively to the H-block. Engagement of the ledges on the plates 693 and 684 brings the contacts 676 positively together and compresses the upper spring 568 slightly.

As in the prior patented machines, the present machine is provided with mechanisms for turning the lasting units about axes substantially perpendicular to the bottom of a shoe being operated upon, as a shoe is fed lengthwise to enable them to engage the shoe at an angle corresponding to the angle of the sewing rib 56 at the points of engagement of the abutments 7. In prior machines the lasting unit turning mechanisms include links and levers which are subject to foreshortening action and considerable lost motion. With shoes requiring large turning movements to be imparted to the lasting units the foreshortening action of the links and levers and the lost motion between them interpose obstacles to proper presentation of the shoe to the lasting units with the result that the abutments 7 sometimes slip off the sewing rib of a shoe. When this occurs the shoe must be presented manually to the lasting units and the operations completed step-by-step under the direct control of the operator.

To avoid difficulty with the lasting unit turning mechanisms and to enable the turning movements of the lasting units to be adjusted with a direct ratio transmission between the mechanisms and the units and without substantial lost motion, the illustrated machine has the connections of its unit turning mechanisms provided by cables and pulleys rather than links and levers. The supports for the lasting units, best shown in Fig. 12, are indicated at 686 and are rotatable in cylindrical bearings 687, which in turn have secured to them the pivotal mountings 10. The upper end of the supports have secured to them grooved collars 688 within the grooves of which are cables 690 (see Fig. 1). The cables pass toward the left of the machine over pulleys 692 and are carried about the larger ones of a pair of concentrially mounted grooved wheels 693 of different diameter rotating on a projecting stationary shaft 694. Each larger wheel 693 has secured to it a smaller wheel to which is connected one end of a driving cable 696. Each larger wheel also has projecting axially from one side an eccentrically disposed pin 698 having stretched between it and a fixed pin 700 on the frame a tension spring 702 tending to rotate the wheels 693 in a counterclockwise direction as viewed in Fig. 1 against the tension of the cables 696. To other ends of the cables 696 are connected yokes 704 having pivotally connected at their lowermost ends a pair of blocks 706 slidingly mounted in arcaute slots of a pair of concentrically mounted cam levers 708 and 710. The centers of curvature of the slots are located substantially at the point of engagement of the cables 696 with the smaller grooved wheels 693 and the sliding movement of the blocks 706 along the levers 708, 710 varies the turning movement imparted to the lasting units in a manner similar to the movements of corresponding blocks in the slots in the machine disclosed in Patent No. 2,589,392. To retain the blocks 706 in adjusted position the levers 708 and 710 and the yokes 704 have a pair of spring pressed plungers 712 engaging notches along the upper surfaces of the respective levers and the plungers carry cross pins 714 for disengaging the plungers from the notches in the levers (see also Fig. 2). The levers 708 and 710 are rotatable on the shaft 190 and have between them three cam rolls 716, two rolls being mounted on lever 708 and one on 710 arranged to engage selectively with cams 718 and 720 shiftable axially as a unit and carried by a common hub which is keyed to the pattern cam shaft 5 but which is slidable thereon. The lever 708 is formed with an auxiliary arm 722 supporting a roll 716 (Fig. 2) with the roll on the lever 710 disposed between those on the lever 708.

Of the cams 718 and 720, the right one 718 is of a shape intended to control the turning movements of one of the lasting units while operating along one side of a shoe. The other, being the left cam 720, is of a shape intended to control the turning movements of the other lasting unit while operating along the opposite side of the shoe. When the cams 718 and 720 are shifted in one direction the cable connections are actuated properly for lasting a right shoe and when shifted in the other direction the connections are actuated properly for lasting a left shoe, one of the rolls 716 always being idle. The central cam roll 716 acts with either cam 718 or 720 during operation on a right or left shoe. The outside rolls 716 act only on one cam, being idle at other times.

To shift the cams 718 and 720 relatively to the cam rolls 716, the hub of the cams has a grooved projection 724, the groove of which is engaged by a pair of radially disposed lugs on an operator actuated yoke lever 726 mounted on a pin 728 having its ends secured in upwardly projecting braces on the frame of the machine. A laterally extending arm of the yoke lever has pivotally connected to it a pair of links 730, the lower ends of which are pivotally connected to an arm 732 secured to a treadle shaft 734. The shaft 734 is rotatable in bearings in the main frame and carries at its outer end a two armed foot treadle 736 arranged for rocking the shaft in either direction.

Referring further to Fig. 12, the mechanism for actuating the lasting grippers in the illustrated machine has been simplified and improved, the mass and sluggishness in action of the connections in the gripper actuating mechanisms having been substantially reduced. With the present construction, springs have been introduced in the actuating connections to enable the grippers to yield both simultaneously and independently of each other during the upper tensioning strokes. For this purpose, a cam 738 has been provided having an internal single sided guiding surface 739. The cam 738 is secured to the main operating shaft 4 and is engaged by a roll 740 on a cam lever 742 fulcrumed on a cross shaft 744. Also fulcrumed on the cross shaft 744 is a gripper actuating lever 746, the forward end of which is pivotally connected to a crosshead 748. The crosshead is maintained in horizontal position by a link 750 pivotally connected thereto and rotatable on a shaft 752 above and in parallel relation to the shaft 744. To hold the roll 740 against the cam 738 a spring 754 is stretched between the cam lever 742 and an upwardly extending bar 756 secured to the lasting head 3.

To permit the lasting grippers to yield simultaneously during their upper tensioning strokes the gripper actuating lever 746 is yieldingly connected to the cam lever 742. For connecting the gripper actuating lever, the rearward end of the lever has a threaded opening within which a threaded sleeve 758 is located. Acting on the upper surface of the sleeve is a coil spring 760 surrounding a threaded rod 762, the upper end of which has a spring adjusting thumb nut 764 acting to compress the coil spring against the threaded sleeve 758. The lower end of the threaded rod 762 is provided with an eye carrying a pin 766. The pin 766 forms a pivotal connection on the upper end of a link 768 the lower end of which is connected to a horizontal arm of a cam lever 770 rotatably mounted on the shaft 190. The cam lever has a roll 772 arranged to be engaged by a cam 774 on the pattern cam shaft 5. During the first few and final lasting operations on a shoe, the cam 774 engages the roll 772 to hold the lasting grippers out of engagement with the shoe. During the remainder of the lasting operations the cam 774 is disengaged from the roll 772 and the grippers act in the normal way, the major portion of the periphery on the cam being of insufficient radius to engage the roll 772.

To enable each gripper to yield independently of the other during its upper tensioning stroke the crosshead 748 has pivotally mounted thereon a pair of elbow levers 776 pivotally connected to links 778. The links 778 are pivotally connected to slide members 780, in turn pivotally connected to links 782, as in prior machines of this type. The links 782 carry at their lower ends a pair of pins 784 extending through approximately vertical slots in inner jaws 786 of the grippers. Fulcrumed on the inner jaws at 788 are the outer jaws 790 having their upper ends connected to the pin 784 by means of links 792 acting with the slots in which the pins ride to wedge the jaws together in grasping and stretching a shoe upper. The independent yielding action is imparted to the grippers by the elbow levers 776 which at their upper end engage springs 794 compressed between recesses in the levers and overhanging arms of the crosshead 748. To regulate the extent of yielding action and to adjust the yielding force applied individually to the lasting grippers, the springs 794 extend into threaded openings within the crosshead overhanging arms and the threaded openings receive a pair of adjusting screws 796. The adjusting screws 796 each have a central projection of reduced diameter passing through the coils of each spring 794 in a position to be engaged by the corresponding elbow lever 776. Rotation of the adjusting screws increases or decreases the distance through which the elbow levers may move in compressing the springs 794, the elbow levers engaging the reduced projections on the adjusting screws at the ends of their yielding movements. In other respects, the construction and operation of the lasting gripper actuating mechanism is similar to that of the prior patents above referred to. One advantage of the present construction is in its adaptability through individual adjustment of the several springs.

For convenience in bringing a shoe into engagement with the lasting abutments 7 at the beginning of a lasting operation manually actuated means are provided for to break the jack depressing toggle. To this end the lowermost toggle link 614, best shown in Figs. 3 and 18, has an inclined cam surface along its rearward edge arranged to be engaged by a pin 798 mounted on an arm 800 made fast to a shaft 802. The shaft 802 is rotatable in flanged bushing 804 bolted to the side of the machine frame and has secured to its outer end a forwardly extending handle arm 806 provided with a spherical knob at its outer end. When the knob is depressed the pin 798 forces the link 614 forwardly and breaks the alignment of the toggle links. For accomplishing the same result when the starting treadle lever 174 is depressed the pin 176 on which the starting treadle lever is fulcrumed also provides a fulcrum for a toggle breaking lever 808, the upper end of which is provided with a pin 810 arranged to engage the lower end of the toggle link 614. The outer end of the toggle breaking lever 808 is located close to that of the starting lever 174 for easy simultaneous operation.

The invention having been described what is claimed is:

1. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame on the main frame and shoe supporting means on the jack frame including an arcuately guided pitch carriage rotatable about an axis passing transversely to the length of the shoe to impart a lengthwise pitch to the shoe, and a feed carriage mounted on the pitch carriage for rectilinear motion lengthwise of the shoe, in combination with separate mechanisms driven by the pattern cam shaft and connected to the pitch and feed carriages for actuating said carriages in predetermined coordinated relation to each other to present the shoe properly to the operating devices as the operation progresses.

2. A machine for use in the manufacture of shoes, having a main frame, devices for operating on a shoe provided with a pair of abutments acting to guide simultaneous operations progressively along the shoe at opposite sides of a center line running between the marginal portions of a shoe bottom, a pattern cam shaft in the main frame, a jack frame on the main frame, shoe supporting means on the jack frame including an arcuately guided pitch carriage rotatable about an axis passing through the points of engagement of the abutments on the shoe bottom to impart a lengthwise pitch to the shoe and a feed carriage mounted on the pitch carriage for straight line motion lengthwise of the shoe, and size adjustable mechanism driven by the pattern cam shaft for actuating the feed carriage, in combination with separate mechanism driven by the cam shaft for actuating the pitch carriage as the operation progresses in properly coordinated relation to the feed carriage regardless of the adjustment of the feed mechanism.

3. A machine for use in the manufacture of shoes, having a main frame, devices for operating on a shoe provided with a pair of abutments acting to guide simultaneous operations progressively along the shoe at opposite sides of a center line running between the marginal portions of a shoe bottom, a pattern cam shaft in the main frame, a jack frame on the main frame, shoe supporting means on the jack frame including an arcuately guided pitch carriage rotatable about an axis passing through the points of engagement of the abutments on the shoe bottom to impart a lengthwise pitch to the shoe, and a feed carriage mounted on the pitch carriage for straight line movement lengthwise of the shoe, and size adjustable mechanism driven by the pattern cam shaft for actuating the feed carriage, in combination with separate mechanism driven by the pattern cam shaft for actuating the pitch carriage as the operation progresses in properly coordinated relation to the feed carriage regardless of the adjustment of the feed mechanism and an irreversible drive in the pitch mechanism to prevent reaction on the pattern cam shaft through the pitch mechanism as a result of engagement between the abutments and the shoe bottom.

4. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame on the main frame, shoe supporting means on the jack frame including an arcuately guided pitch carriage rotatable about an axis passing through the points of engagement of the abutments on the shoe bottom to impart a lengthwise pitch to the shoe and a feed carriage mounted on the pitch carriage for straight line movement lengthwise of the shoe, and size adjustable mechanism driven by the pattern cam shaft for actuating the feed carriage, in combination with separate mechanism driven by the pattern cam shaft for actuating the pitch carriage as the operation progresses in properly coordinated relation to the feed carriage regardless of the adjustment of the feed mechanism and an irreversible drive in the pitch mechanism to prevent reaction on the pattern cam shaft through the pitch mechanism as a result of engagement between the abutments and the shoe bottom comprising a low pitch worm and wheel connection in said mechanism.

5. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame on the main frame, shoe supporting means on the jack frame including an arcuately guided pitch carriage rotatable about an axis passing through the points of engagement of the abutments on the shoe bottom to impart a lengthwise pitch to the shoe and a feed carriage mounted on the pitch carriage for straight line movement lengthwise of the shoe, and size adjustable mechanism driven by the pattern cam shaft for actuating the feed carriage, in combination with separate mechanism driven by the pattern cam shaft for actuating the pitch carriage as the operation progresses in properly coordinated relation to the feed carriage regardless of the adjustment of the feed mechanism, an irreversible drive in the pitch mechanism to prevent reaction on the pattern cam shaft through the pitch mechanism by reason of engagement between the abutments and the shoe bottom and step cams on the pattern cam shaft for actuating the feed and pitch carriages, the steps of the respective cams being disposed in out-of-phase time relation.

6. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame, and shoe supporting means on the jack frame including a feed carriage guided for straight line movement lengthwise of the shoe, a balancing cradle on the feed carriage having a pivotal mounting extending lengthwise of the shoe and a slotted block on the cradle engaging the pivot of the mounting to enable the cradle to be shifted transversely of the shoe length, in combination with mechanism for shifting the slotted block transversely of the pivot comprising a countershaft rotatable in the main frame under the control of the pattern cam shaft, a cam on the countershaft, a follower actuated by the countershaft cam and a Bowden wire connection between the countershaft cam follower and the cradle.

7. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame, and shoe supporting means on the jack frame including a feed carriage guided for straight line movement lengthwise of the shoe, a balancing cradle on the feed carriage having a pivotal mounting extending lengthwise of the shoe, a slotted block means on the cradle, one slot of which extends parallel to the bottom of the shoe transversely to the length of the shoe and is engaged by the pivot of the mounting to enable the cradle to be shifted on the pivot of the mounting and another slot of which extends heightwise of the shoe and at right angles to the transverse slot, in combination with mechanism for shifting the slotted block transversely of the pivot, comprising a roll engaging the heightwise slot in the slotted block, and a supporting slide for said roll guided on the feed carriage to resist transverse components of heightwise pressure on the shoe.

8. A machine for use in the manufacture of shoes, having a main frame, devices for operating on a shoe provided with a pair of abutments acting to guide simultaneous operations progressively along the shoe at opposite sides of a center line running between the marginal portions of the shoe bottom, a pattern cam shaft in the main frame, a jack frame, and shoe supporting means on the jack frame including a feed carriage guided for straight line movement lengthwise of the shoe, a balancing cradle on the feed carriage having a pivotal mounting extending lengthwise of the shoe, a slotted block means on the cradle, one slot of which extends parallel to the bottom of the shoe transversely to the length of the shoe and is engaged by the pivot of the mounting to enable the cradle to be shifted on the pivot of the mounting and another slot of which extends heightwise of the shoe and at right angles to the transverse slot, in combination with mechanism for shifting the slotted block transversely of the pivot, comprising a roll engaging the heightwise slot in the slotted block, a supporting slide for said roll guided on the feed carriage to resist transverse components of heightwise pressure on the shoe, a countershaft rotatable in the main frame under the control of the pattern cam shaft, a cam on the countershaft, a follower actuated by the countershaft cam, and a Bowden wire connection between the countershaft cam follower and the roll supporting slide.

9. A machine for use in the manufacture of shoes having devices for performing an operation progressively along a shoe bottom and a shoe supporting jack including a feed carriage, a guideway on the jack along which the feed carriage is mounted for movement lengthwise of the shoe and shoe clamping means on the feed carriage, in combination with connections between the shoe clamping means and the guideway for actuating the clamping means during movement of the feed carriage.

10. A machine for use in the manufacture of shoes having devices for operating on a shoe provided with abutments acting along opposite marginal portions of the shoe bottom to guide simultaneous operations progressively along the shoe, and a shoe supporting jack including a feed carriage, a guideway along which the feed carriage is mounted for movement lengthwise of the shoe, a balancing cradle on the feed carriage guided for arcuate movement about an axis extending lengthwise of the shoe and shoe clamping means on the balancing cradle, in combination with connections between the guideway and the shoe clamping means comprising a Bowden wire for releasing the shoe from the clamping means at the end of the shoe feeding movement of the feed carriage.

11. A machine for use in the manufacture of shoes having devices for operating on a shoe provided with abutments acting to guide simultaneous operations progressively along opposite marginal portions of the shoe bottom and a shoe supporting jack including a feed carriage, a guideway along which the feed carriage is mounted for movement lengthwise of the shoe, a balancing cradle on the feed carriage guided for arcuate movement about an axis lengthwise of the shoe and shoe clamping means on the balancing cradle, in combination with connections between the guideway and the shoe clamping means comprising a Bowden wire for releasing the shoe from the clamping means at the end of the shoe feeding movement of the feed carriage and a latch for disconnecting the shoe clamp releasing connections after the shoe has been released.

12. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam follower and the feed carriage comprising driving and driven members, the motion transfer between which is uniform throughout the range of travel with any size adjustment of the connections.

13. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam follower and the feed carriage comprising driving and driven slides mounted for spaced parallel movement and a uniform ratio linkage between the slides.

14. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam shaft and the feed carriage comprising driving and driven slides mounted for spaced parallel movement and a parallelogram linkage having pivotal joints on separate members of said linkage connecting the respective slides.

15. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam follower and the feed carriage comprising driving and driven slides mounted for spaced parallel movement, a follower supporting lever provided with a variable effective length arm operatively connected to the driving slide and a uniform ratio linkage connected between the driving and driven slides.

16. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam shaft and the feed carriage comprising driving and driven slides mounted for spaced parallel movement, a cam follower supporting lever provided with a variable effective length arm pivotally connected to the driving slide, and a length changing connection between the variable length arm and the feed carriage.

17. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam shaft and the feed carriage comprising driving and driven slides mounted for spaced parallel movement, a follower supporting lever provided with a variable effective length arm pivotally connected to the driving slide, uniform ratio transfer linkage between the slides, a cable connected between the variable length arm and the driven slide, a lock for securing the arm to prevent variation in its effective length during operation of the machine and a yieldingly actuated idler for retaining tension in the cable after the lock is actuated.

18. A machine for use in the manufacture of shoes having devices for performing an operation progressively along the marginal portions of a shoe, a shoe supporting jack including a feed carriage and a guideway along which the feed carriage is mounted for movement lengthwise of the shoe, a pattern cam shaft and a pattern cam follower for actuating the feed carriage along the guideway, in combination with shoe size adjustable connections between the cam shaft and the feed carriage comprising driving and driven slides mounted for spaced parallel movement, a pattern cam actuated lever provided with a variable length arm pivotally connected to the driving slide, and a snubber connected to the cam lever for retarding the return movement of the feed carriage to starting position.

19. A machine for use in the manufacture of shoes having a main frame, devices including a shoe engaging abutment acting to perform an operation on a shoe, a shoe supporting jack mounted on the frame for feeding movement relatively to the operating devices, three yielding members in the base, one of which acts intermittently to press the shoe against the abutment and to diminish the pressure of the shoe on the abutment, another of which counterbalances all of the weight of the jack except that amount required to cause the shoe to drop away from the abutment when the operations are completed and the third of which provides a light upward pressure of the shoe on the abutment to maintain the shoe in operating position, and a toggle for depressing the jack at the end of the lasting operations, in combination with mechanism acting through the third yielding member to maintain the upward pressure thereof throughout the operations of the operating devices and to diminish the pressure to a point just sufficient to maintain the shoe in operating position at the end of the operations upon the shoe.

20. A machine for use in the manufacture of shoes having a main frame, devices including a shoe engaging abutment acting to perform an operation on a shoe, a shoe supporting jack mounted on the frame for feeding movement relatively to the operating devices, three yielding members in the base, one of which acts intermittently to press the shoe against the abutment, another of which counterbalances all the weight of the jack except that amount required to cause the shoe to drop away from the abutment when the operations are completed and a third of which provides a light upward pressure of the shoe on the abutment during feeding movements of the shoe, and mechanism for rendering said first-mentioned yielding member inoperative during feeding movements of the shoe, in combination with mechanism for stressing the third yielding member to maintain upward pressure on the shoe in compensation for the curvature of the shoe and for diminishing the stress in the third yielding member when the operations are being completed.

21. A machine for use in the manufacture of shoes having a main frame, devices provided with a shoe engaging abutment acting intermittently to perform an operation successively along the shoe, a shoe supporting jack on the frame arranged for feeding movement relatively to the operating devices, a main shaft for operating said devices, a pattern cam shaft in the frame for actuating the jack relatively to the operating devices to feed and present the shoe properly thereto, three yielding members, one of which presses the shoe against the abutment, another of which counterbalances all the weight of the jack except that amount required to cause the shoe to drop away from the abutment when the operations are completed and a third of which provides a light upward pressure of the shoe to prevent displacement of the shoe while the pressure of the first-mentioned yielding member is released, and mechanism driven by the main shaft for actuating said first-mentioned yielding member intermittently to render said first yielding member inoperative during feeding movement of the shoe, in combination with mechanism actuated by the pattern cam shaft for diminishing the stress in the third yielding member at the end of the operations on the shoe when the first yielding member is rendered inoperative.

22. A machine for use in the manufacture of shoes having a main frame, devices provided with a shoe engaging abutment acting intermittently to perform an operation successively along the shoe, a shoe supporting jack on the frame arranged for feeding movement relatively to the operating devices, a main shaft for operating said devices, a pattern cam shaft in the frame for actuating the jack relatively to the operating devices to feed and present the shoe properly thereto, three springs, the first of which presses the shoe against the abutment, the second of which has one end fixed and counterbalances all the weight of the jack except that amount required to cause the shoe to drop away from the abutment when the operations are completed, and a third of which provides a light upward pressure of the shoe to prevent displacement of the shoe, and mechanism driven by the main shaft and connected to the first spring for actuating it intermittently to render it inoperative during feeding movements of the shoe, in combination with mechanism actuated by the pattern cam shaft and acting directly on the third spring to diminish its stress when the operations on the shoe are being completed and the first spring is rendered inoperative.

23. A shoe side lasting machine having a main frame, a shoe supporting jack on the frame, two sets of lasting devices arranged to act on an upper at opposite sides of a shoe supported on the jack, means for actuating said devices progressively to last both sides of the shoe upper simultaneously as the point of operation is transferred along the shoe, supports upon which said devices are mounted movable toward and from each other, and yielding means tending to spread said supports to position the lasting devices varying distances apart as the shoe bottom varies in width as the shoe is fed, in combination with mechanism responsive to a disengagement of a lasting device from proper operating position on the shoe comprising a pattern cam and connections between the yielding means and the cam acting during operation of the machine for maintaining the force of the yielding means substantially constant and a tripping device connected to the yielding means, acting when the force resisting the yielding means is substantially reduced to bring the machine to rest.

24. A side lasting machine having a main frame, a shoe supporting jack on the frame, two sets of lasting devices including upper tensioning grippers, stapling units for operating simultaneously along opposite sides of a shoe carried by the jack and provided with a ribbed insole, to pull the upper into lasted relation with the rib on the insole and shoe engaging abutments against which the stapling units act, supports upon which said devices are mounted movable toward and from each other and yielding means for spreading said supports to press said abutments against the rib on the insole as the shoe bottom varies in width along its length, in combination with means for maintaining the engagement of an abutment along a rib on the insole comprising a pattern cam and connections between the yielding means and the cam acting to apply a substantially uniform force to the yielding means as the shoe is moved lengthwise of the lasting devices and a tripping device connected to the yielding means acting to bring the machine to rest when the force resisting the yielding means becomes substantially reduced.

25. A side lasting machine having a main frame, a shoe supporting jack on the frame, two sets of lasting devices including upper tensioning grippers for operating simultaneously along opposite sides of a shoe carried by the jack and provided with a ribbed insole, to pull the upper into lasted relation with the rib on the insole and shoe engaging abutments, supports upon which said devices are mounted movable toward and from each other and yielding means for spreading said supports to press said abutments against the rib on the insole as the shoe bottom varies in width along its length, in combination with means for maintaining the engagement of an abutment along a rib on the insole comprising a pattern cam and connections actuated by the cam to apply a substantially uniform force to the yielding means as the shoe is moved lengthwise of the lasting devices, a tripping device actuated to bring the machine to rest when the force resisting the yielding means becomes substantially reduced, means for adjusting said supports to vary the separation of the lasting device prior to the start of the lasting operations and a lock between the adjusting means and the cam connections arranged to be locked before the machine is started and to be unlocked thereafter.

26. A shoe side lasting machine having a main frame, a shoe supporting jack on the frame, two sets of lasting devices arranged to act on an upper at opposite sides of a shoe supported on the jack, means for actuating said devices progressively to last both sides of the shoe upper simultaneously as the point of operation is transferred along the shoe, supports upon which said devices are mounted movable toward and from each other, shoe feeding mechanism having connections for adjusting the feed motion imparted to the shoe in accordance with shoe sizes and means for locking the adjustable feed connections, in combination with mechanism for varying the movements of the supports for the lasting devices toward and from each other as the shoe is fed past the lasting devices, including a cam actuated lever, and connections between the supports and the cam actuated lever including a lock for disconnecting the connections.

27. A shoe side lasting machine having a main frame, a shoe supporting jack on the frame, two sets of lasting devices arranged to act on an upper at opposite sides of a shoe supported on the jack, means for actuating said devices progressively to last both sides of the shoe upper simultaneously as the point of operation is transferred along the shoe, supports upon which said devices are mounted movable toward and from each other, shoe feeding mechanism having connections for adjusting the feed motion imparted to the shoe in accordance with shoe sizes and means for locking the adjustable feed connections, in combination with mechanism for varying the movements of the supports for the lasting devices toward and from each other as the shoe is fed past the lasting devices, including a cam actuated lever, connections thereto including a lock for disconnecting the connections, and means for actuating the locking means and thereafter to lock the feeding mechanism in starting the machine in operation.

28. A shoe side lasting machine having a main frame, a shoe supporting jack on the frame, two sets of lasting devices arranged to act on an upper at opposite sides of a shoe supported on the jack, means for actuating said devices progressively to last both sides of a shoe upper simultaneously as the point of operation is transferred along the shoe and supports upon which said lasting devices are mounted movable toward and from each other, in combination with mechanism comprising connections and a pair of springs for spreading and drawing together, respectively, the supports for the lasting devices during lasting operations.

29. A shoe side lasting machine having a main frame, a shoe supporting jack on the frame, two sets of lasting devices arranged to act on an upper at opposite sides of a shoe supported on the jack, means for actuating said devices progressively to last both sides of a shoe upper simultaneously as the point of operation is transferred along the shoe and supports upon which said lasting devices are mounted movable toward and from each other, in combination with mechanism for spreading and drawing together, respectively, the supports for the lasting devices during lasting operations comprising a pattern cam and connections including a pair of opposed springs actuated by the cam.

30. A shoe side lasting machine having a main frame, a shoe supporting jack on the frame, two sets of lasting devices arranged to act on an upper at opposite sides of a shoe supported on the jack, means for actuating said devices progressively to last both sides of the shoe upper simultaneously as the point of operation is transferred along the shoe, supports upon which said devices are mounted movable toward and from each other, yielding means tending to spread said supports to position the lasting devices varying distances apart as the shoe bottom varies in width and means for holding the lasting devices together before the machine is started, in combination with mechanism for spreading and drawing together the supports for the lasting devices, comprising a pattern cam, connections actuated by the cam, a lock for connecting the connections before lasting operations are started and means for unlocking the lock after the lasting operations are completed.

31. A shoe side lasting machine having a main frame, a shoe supporting jack on the frame, two sets of lasting devices arranged to act on an upper at opposite sides of a shoe supported on the jack, means for actuating said devices progressively to last both sides of the shoe upper simultaneously as the point of operations is transferred along the shoe, supports upon which said devices are mounted movable toward and from each other and yielding connections for spreading said supports as the shoe bottom varies in width along its length, in combination with electrical contacts on said connections for indicating displacement of a lasting device from proper operating relationship with a shoe and means for stopping operation of the lasting devices controlled by the contacts.

32. A shoe side lasting machine having a main frame, a shoe supporting jack on the frame, two sets of lasting devices for operating simultaneously along opposite sides of a shoe carried by the jack and provided with a ribbed insole, and shoe engaging abutments, supports upon which said devices are mounted movable toward and from each other and yielding means for spreading said supports to press the abutments against the inside of the insole rib as the shoe bottom varies in width along its length, in combination with mechanism for varying the movements of the supports for the lasting devices toward and from each other including a cam actuated lever, connections for actuating the yielding means, electrical contacts on the connections rendered operative when an abutment is disengaged from the rib on the insole and means for stopping the operation of the lasting devices when the contacts are actuated.

33. A machine for use in the manufacture of shoes having a main frame, a shoe supporting jack mounted for movement in the frame, two sets of devices arranged at opposite sides of a shoe supported upon the jack, mechanism for actuating said devices to operate progressively along both sides of the shoe, supports upon which said devices are mounted for independent turning movement about axes substantially perpendicular to the shoe bottom, a pattern cam shaft and connections controlled by the pattern cam shaft to change the relative positions of said devices and jack during the operation on a shoe, in combination with two cams rotatable with the pattern cam shaft and mounted in side-by-side relation, three cam rolls actuated by the cams, and means for shifting the cams relatively to the cam rolls to cause one of the cams to act in one relation to the connections during operation on a right shoe and in another relation during operation on a left shoe, one of the cam rolls acting with either cam during operation on a right or a left shoe.

34. A machine for use in the manufacture of shoes having a main frame, a shoe supporting jack mounted for movement in the frame, two sets of devices arranged at opposite sides of a shoe supported upon the jack, mechanism for actuating said devices to operate progressively along both sides of the shoe, supports upon which said devices are mounted for independent turning movement about axes substantially perpendicular to the shoe bottom, a pattern cam shaft and connections controlled by the pattern cam shaft between the pattern cam shaft and said devices to change the relative positions of said devices and jack during the operation on a shoe, in combination with two cams shiftable axially as a unit in side by side relation and rotatable with the pattern cam shaft, two sets of connections operatively connected to the two cams, three rolls on the two cam connected connections and an operator actuated yoke and groove connections with the cams for shifting the cams axially relatively to the cam rolls to cause the cams to be brought into cooperative relation with two of the rolls for a right or a left shoe and two others of the rolls for a left shoe.

35. A machine for use in side lasting shoes having a shoe supporting jack, upper tensioning grippers for operating simultaneously along opposite marginal portions of a shoe provided with a ribbed insole to pull the upper into lasted relation with the rib on the insole, a cam for actuating the grippers to reach for and tension the upper of a shoe on the jack, a lever actuated by the cam and a crosshead pivotally connected to the cam actuated lever, in combination with a spring between the cam lever and the crosshead to enable the grippers to yield simultaneously during their upper tensioning movements, individual springs connecting the crosshead with the grippers for enabling each gripper to yield independently of the other during its upper tensioning movement, and independent adjusting means for the several springs.

HERMAN A. IMHOF.

References Cited in the file of this patent

UNITED STATES PATENTS

| Number | Name | Date |
|--------|------|------|
| 502,506 | Whiffen et al. | Aug. 1, 1893 |
| 1,054,733 | Winkley | Mar. 4, 1913 |
| 1,722,502 | Lawson | July 30, 1929 |
| 2,201,866 | Lawson | May 21, 1940 |
| 2,423,852 | Robinson et al. | July 15, 1947 |